(12) United States Patent
Jummel

(10) Patent No.: US 9,785,734 B2
(45) Date of Patent: Oct. 10, 2017

(54) METHOD AND SYSTEM FOR ADJUSTING A CIRCUIT SYMBOL

(71) Applicant: GLOBALFOUNDRIES Inc., Grand Cayman (KY)

(72) Inventor: Guntram Jummel, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 140 days.

(21) Appl. No.: 14/812,341

(22) Filed: Jul. 29, 2015

(65) Prior Publication Data

US 2017/0032071 A1 Feb. 2, 2017

(51) Int. Cl.
*G06F 17/50* (2006.01)

(52) U.S. Cl.
CPC ...... *G06F 17/5072* (2013.01); *G06F 17/5081* (2013.01)

(58) Field of Classification Search
CPC ...................................... G06F 17/50
USPC ........................................ 716/119
See application file for complete search history.

(56) References Cited

U.S. PATENT DOCUMENTS

| | | | |
|---|---|---|---|
| 7,340,697 B2 | 3/2008 | Boshart et al. | |
| 7,409,651 B2 | 8/2008 | Berger et al. | |
| 7,761,820 B2 | 7/2010 | Berger et al. | |
| 8,516,410 B2 | 8/2013 | Nahmanny et al. | |
| 2004/0143799 A1 | 7/2004 | Hegde et al. | |
| 2004/0143807 A1 | 7/2004 | Hegde et al. | |
| 2006/0045325 A1* | 3/2006 | Zavadsky | G01R 31/31704 382/145 |
| 2014/0039846 A1 | 2/2014 | Aoyama | |

OTHER PUBLICATIONS

OpenPDK Schematic Symbol Standard, Version 1.0, published by Silicon Integration Initiative, Inc., May 24, 2012.
Designing for Mixed Signal Interoperability, Global Semiconductor Alliance, Version 1.0, Jan. 23, 2015.
MunEDA Presentation, Full-Custom Design Migration with MunEDA WiCkeD, Feb. 19, 2013.
(Continued)

*Primary Examiner* — Thuan Do
(74) *Attorney, Agent, or Firm* — Amerson Law Firm, PLLC

(57) ABSTRACT

A method includes obtaining first data representing a first circuit symbol and second data representing a second circuit symbol. The first circuit symbol has a plurality of first pins having a first position vector associated therewith. The second circuit symbol has a plurality of second pins having a second position vector associated therewith, and each of the plurality of second pins corresponds to a respective one of the plurality of first pins. An adjustment transformation mapping position vectors to transform the position vectors is determined. The adjustment transformation minimizes an error measure that is based on one or more deviations. Each deviation is a deviation between a transformed position vector and the first position vector associated with one of the first pins. The transformed position vector is obtained by applying the adjustment transformation to the second position vector associated with the second pin corresponding to the first pin.

20 Claims, 13 Drawing Sheets

(56) References Cited

OTHER PUBLICATIONS

GSA Analog/Mixed Signal Process Design Kit Quality Checklist, Version 4.0, Jul. 29, 2013.
Schoenemann, "A Generalized Solution of the Orthogonal Procrustes Problem," Psychometrika, vol. 31, No. 1, pp. 1-10, Mar. 1966.
Horn et al., "Closed-form solution of absolute orientation using orthonormal matrices," Journal of the Optical Society of America, vol. 5, p. 1127, Jul. 1988.

* cited by examiner

METHOD AND SYSTEM FOR ADJUSTING A CIRCUIT SYMBOL

BACKGROUND OF THE INVENTION

1. Field of the Invention

Generally, the present disclosure relates to the computer-aided design of circuits, and, more particularly, to methods and systems that may be used in the context of a replacement of first circuit symbols in a circuit schematic with second circuit symbols.

2. Description of the Related Art

In the computer-aided design of electronic circuits, electronic design automation tools may be used. Electronic design automation tools may be provided in the form of software that includes instructions that can be carried out by a computer for processing data representing circuit schematics. The circuit schematics can include circuit symbols that represent circuit elements such as, for example, transistors, diodes, resistors, capacitors and inductivities. Additionally, the circuit schematics can include wires that represent electrical connections between the circuit elements.

The data representing a circuit schematic can define positions and orientations of circuit symbols, wires and/or elements thereof, which define positions and orientations at which the circuit symbols, wires and elements thereof are drawn, for example, on a computer monitor and/or a printout of the circuit schematic. These positions are typically different from positions and orientations at which circuit elements and electrical connections are provided in an actual physical implementation of the circuit.

Each circuit symbol can include one or more so-called pins, which can be used for defining connections to portions of a circuit element. For example, a circuit symbol for a field effect transistor can typically have gate, source, drain and, optionally, bulk pins. The pins can be used for defining electrical connections to the circuit element in the circuit, wherein an electrical connection can be considered as having been made to a portion of a circuit element when an end of a wire representing the electrical connection is provided at the position of the pin, in particular, when the end of the wire touches a pin shape such as, for example, a rectangle or a circle, that is centered at the position of the pin.

In addition to pins, the circuit symbol can include an artwork, being a drawing of an icon used to represent an electronic device, as well as parameters and/or text.

Positions of circuit symbols and elements thereof, in particular positions of pins, can be defined on a grid that determines the minimum granularity for the placement thereof.

In the semiconductor industry, process design kits (PDKs) can be provided by foundries. In addition to design rules, simulation models of transistors and layout information, process design kits can define circuit symbols for use in electronic design automation tools. While there have been some attempts to provide a standardization of circuit symbols used in process design kits, such as, for example, the OpenPDK schematic symbol standard (see, for example, the document "OpenPDK Schematic Symbol Standard," V1.0, May 24, 2012, published by the Silicon Integration Initiative, Inc. (Si2™), ISBN: 1-882750-63-2), process design kits wherein proprietary circuit symbols are employed are still in use. These proprietary circuit symbols can differ from standard circuit symbols, in particular, with respect to locations of pins, as well as size, origin, rotation and/or reflections of circuit symbols.

When a circuit schematic is to be converted from a first process design kit to a second process design kit, for example from a process design kit wherein proprietary circuit symbols are used to a process design kit wherein standard circuit symbols, such as circuit symbols in accordance with the OpenPDK V1.0 Standard, are used, issues can occur which can, in particular, be related to different positions of pins. Since, as described above, positions of pins can be relevant for determining the connection of devices, replacing circuit symbols from the first process design kit with circuit symbols from the second process design kit having different pin positions can lead to a loss of connectivity. Therefore, further adjustments, in addition to a replacement of circuit symbols, may be necessary.

U.S. Patent Publication No. 2014/0039846 discloses an information processing method that includes identifying, by a computer, a first component of a first category included in circuit data including a plurality of components, when receiving a first instruction to replace the first component with a second component of a second category; generating layers on which the second component is to be arranged; acquiring correlation between a pin of the first component and a pin of the second component; and replacing the first component with the second component arranged on the layers based on the correlation.

Known methods for converting circuit schematics from a first process design kit to a second process design kit typically rely on empirical user-defined mapping files or similar lookup mechanisms, the provision of which can require a relatively large amount of work. Furthermore, in some cases, manual input from a user for replacing, rotating, moving and/or rewiring circuit symbols may be required.

The present disclosure provides methods and system that can help to substantially overcome or at least reduce some or all of the above-described issues.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

An illustrative method described herein includes obtaining first data representing a first circuit symbol. The first circuit symbol has a plurality of first pins. Each first pin has a first position vector associated therewith. Second data representing a second circuit symbol are obtained. The second circuit symbol has a plurality of second pins. Each second pin has a second position vector associated therewith. Each of the plurality of second pins corresponds to a respective one of the plurality of first pins. An adjustment transformation mapping position vectors to transformed position vectors is determined. The adjustment transformation minimizes an error measure that is based on one or more deviations. Each deviation is a deviation between a transformed position vector and the first position vector associated with one of the first pins. The transformed position vector is obtainable by applying the adjustment transformation to the second position vector associated with the second pin corresponding to the first pin.

Another illustrative method described herein includes obtaining first data representing a first circuit symbol. The first circuit symbol has a plurality of first pins. Each first pin has a first position vector associated therewith. Second data representing a second circuit symbol are obtained. The second circuit symbol has a plurality of second pins. Each second pin has a second position vector associated therewith. Each of the plurality of second pins corresponds to a respective one of the plurality of first pins. An adjustment transformation mapping position vectors to transformed position vectors is determined. The determining of the adjustment transformation includes calculating an adjustment orientation matrix. The calculation of the adjustment orientation matrix includes forming a first pin position matrix and a second pin position matrix. Each of the first pin position matrix and the second pin position matrix has a number of rows being equal to or greater than a number of the plurality of first pins and a number of the plurality of second pins. Each of the rows of the first pin position matrix includes components of a respective vector that is obtained by subtracting a mean of a first set of position vectors that includes the plurality of first position vectors and, if the number of rows of the first pin position matrix and the second pin position matrix is greater than the number of the plurality of first pins and the number of the plurality of second pins, at least one duplicate of at least one of the plurality of first position vectors from a respective member of the first set of position vectors. Each of the rows of the second pin position matrix includes components of a respective vector that is obtained by subtracting a mean of a second set of position vectors that includes the plurality of second position vectors and, if the number of rows of the first pin position matrix and the second pin position matrix is greater than the number of the plurality of first pins and the number of the plurality of second pins, at least one duplicate of at least one of the second position vectors, from a respective member of the second set of position vectors. The calculation of the adjustment orientation matrix further includes calculating a pseudoinverse of one of the first pin position matrix and the second pin position matrix and multiplying the pseudoinverse of the one of the first pin position matrix and the second pin position matrix with the other of the first pin position matrix and the second pin position matrix.

An illustrative system disclosed herein includes a memory and an adjustment transformation calculator. The memory includes first data and second data. The first data represent a first circuit symbol. The first circuit symbol has a plurality of first pins. Each of the plurality of first pins has a first position vector associated therewith. The second data represent a second circuit symbol. The second circuit symbol has a plurality of second pins. Each of the plurality of second pins has a second position vector associated therewith, and each of the plurality of second pins corresponds to a respective one of the plurality of first pins. The adjustment transformation calculator determines an adjustment transformation mapping position vectors to transformed position vectors. The adjustment transformation minimizes an error measure that is based on one or more deviations. Each deviation is a deviation between a transformed position vector and the first position vector associated with one of the first pins. The transformed position vector is obtainable by applying the adjustment transformation to the second position vector associated with the second pin corresponding to the first pin.

Another illustrative system disclosed herein includes means for obtaining first data representing a first circuit symbol. The first circuit symbol has a plurality of first pins. Each of the plurality of first pins has a first position vector associated therewith. The system additionally includes means for obtaining second data representing a second circuit symbol. The second circuit symbol has a plurality of second pins. Each of the plurality of second pins has a second position vector associated therewith, and each of the plurality of second pins corresponds to a respective one of the plurality of first pins. The system further includes means for determining an adjustment transformation. The adjustment transformation maps position vectors to transformed position vectors, wherein the adjustment transformation minimizes an error measure. The error measure is based on one or more deviations. Each deviation is a deviation between a transformed position vector and the first position vector associated with one of the first pins. The transformed position vector is obtainable by applying the adjustment transformation to the second position vector associated with the second pin corresponding to the first pin.

An illustrative computer-readable storage medium described herein includes code for causing a computer to obtain first data, to obtain second data, and to determine an adjustment transformation. The first data represent a first circuit symbol. The first circuit symbol has a plurality of first pins. Each first pin has a first position vector associated therewith. The second data represent a second circuit symbol. The second circuit symbol has a plurality of second pins. Each of the plurality of second pins has a second position vector associated therewith. Each of the plurality of second pins corresponds to a respective one of the plurality of first pins. The adjustment transformation maps position vectors to transformed position vectors. The adjustment transformation minimizes an error measure that is based on one or more deviations. Each deviation is a deviation between a transformed position vector and the first position vector associated with one of the first pins. The transformed position vector is obtainable by applying the adjustment transformation to the second position vector associated with the second pin corresponding to the first pin.

BRIEF DESCRIPTION OF THE DRAWINGS

The disclosure may be understood by reference to the following description taken in conjunction with the accompanying drawings, in which like reference numerals identify like elements, and in which.

Figure 1:
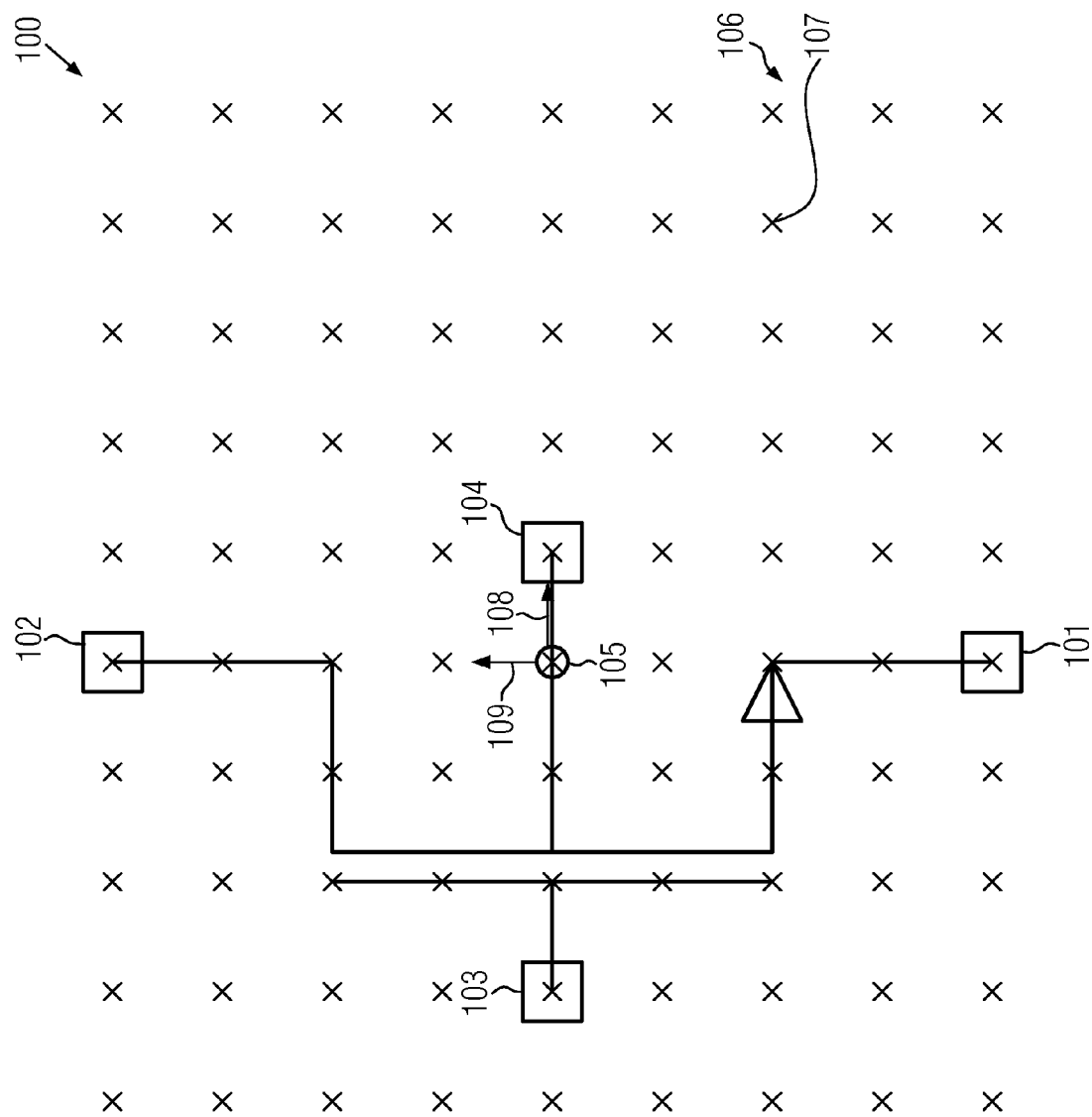
FIGS. 1 and 2 schematically illustrate transistor symbols.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

Embodiments disclosed herein provide systems and methods for circuit schematic translation between process design kits including instance master symbols with different circuit symbol footprints. Techniques described herein can include one or more of an automatic correction of reflection (mirroring), rotation and translation of instances of circuit symbols, a rewiring of relocated instances to reestablish correct circuit connectivity, and/or a comparison of netlists to validate the connectivity preservation. An adjustment transformation between circuit symbol footprints of the process design kits can be automatically determined using a singular value decomposition of a pin position matrix. Coordinates can be rounded to a snap grid. The resulting error vectors can be computed and translated into wire coordinates.

In some embodiments, circuit schematics stored in databases (for example, OpenAccess) can contain instances of circuit symbols with instance transformation information. The symbols for individual circuit elements in a circuit schematic can be provided in the form of instances of circuit symbols being instance master symbols, wherein each instance of the circuit symbol includes instance transformation information, which can define a rotation, a reflection and/or a translation (displacement) that are applied to the instance master symbol for providing the respective instance of the circuit symbol.

For each instance of a first circuit symbol, the instance transformation information can be stored and reverted so that the instance of the first circuit symbol is reflected, rotated and/or moved to an origin. Then, the adjustment transformation that was determined for the instance master symbol of the instance of the circuit symbol can be applied to an instance of a second circuit symbol that is to replace the instance of the first circuit symbol, which can include performing a reflection, a rotation and/or a translation of the instance. Then, the stored instance transformation information can be used for transforming the instance of the second circuit symbol, to which the adjustment transformation has been applied, to the destination location in the circuit schematic. Additionally, wires can be provided on the basis of the wire coordinates that were calculated for the master symbols, and the wires can be transformed to locations in the circuit schematic using the stored instance transform for the instance of the first circuit symbol. Before and after these schematic manipulation operations, the circuit schematic can be translated into a netlist, and a standard netlist comparison tool can be used to validate the preservation of the connectivity of the circuit.

In some embodiments, a scaling of circuit schematics and circuit symbols and/or a scaling of a snap grid can be performed before the determination of the adjustment transformation and any schematic manipulation operations. In some embodiments, instead of using an adjustment transformation in symbol master coordinates, along with stored and reapplied instance transformations after the adjustment transformation and rewiring, an instance transformation for each instance of the second circuit symbol can be determined in circuit schematic coordinates.

In the following, embodiments relating to techniques for translating a circuit schematic from a first process design kit to a second process design kit will be described with reference to the figures.

FIG. 1 shows a schematic view of a first transistor symbol 100 that can be provided by the first process design kit as an instance master symbol for an N-channel field effect transistor. The first transistor symbol 100 includes a source pin 101, a drain pin 102, a gate pin 103 and a body pin 104. Each of the pins 101, 102, 103, 104 can have a center point and a size. In FIG. 1, the sizes of the pins 101, 102, 103, 104 are schematically illustrated by squares, wherein the center points of the pins 101, 102, 103, 104 are typically located at centers of the squares, being points of intersections of the diagonals of the squares.

The center points of the pins 101, 102, 103, 104 can be located at grid points of a snap grid 106. The snap grid 106 can be a regular square lattice of grid points. In FIG. 1, reference numeral 107 exemplarily denotes one of the grid points of the snap grid 106. In the plane of drawing of FIG. 1, a first grid axis of the snap grid 106, which is sometimes denoted as "x-axis" herein, extends in the horizontal direction, and a second grid axis of the snap grid 106, which is sometimes denoted as "y-axis" herein, extends in the vertical direction. Pitches between the grid points of the snap grid 106 shown in FIG. 1 are of an exemplary nature only; in some embodiments, a greater or smaller pitch can be used.

In FIG. 1, reference numeral 105 denotes an origin of a circuit symbol master coordinate system, which can be located at one of the grid points 107 of the snap grid 106. Reference numerals 108, 109 denote an x-axis and a y-axis, respectively, of the circuit symbol master coordinate system, which correspond to the x-axis and y-axis of the snap grid 106.

Positions of the center points of the pins 101, 102, 103, 104 can be represented by position vectors, wherein a respective position vector is associated with each of the pins 101, 102, 103, 104. The position vectors can be two-dimensional vectors, each of which has an x-component and a y-component, wherein the x-component denotes a distance between the center point of the pin and the origin 105 along the x-axis 108, and the y-component denotes a distance between the center point of the pin and the origin 105 along the y-axis 109. For example, the position vectors associated with the source pin 101 and the drain pin 102, respectively, can have x-components of 0, and y-components corresponding to the respective distances between the center points of the pins 101, 102 and the origin 105. The position vectors associated with the gate pin 103 and the body pin 104 have a y-component of 0 and a nonzero x-component.

In the following, for convenience, the positions of the center points of the pins 101, 102, 103, 104 will sometimes be denoted as "positions of the pins."

In addition to the pins 101, 102, 103, 104, the first transistor symbol 100 can include an artwork, being a drawing of an icon that is used to represent the N-channel field effect transistor. Additionally, the first transistor symbol 100 can include other elements (not shown in FIG. 1), for example, an instance boundary, parameters and/or text, in accordance with known circuit symbols that are used in known electronic design automation tools.

For providing the first transistor symbol 100, the first process design kit can include data representing the first transistor symbol 100.

Figure 3:
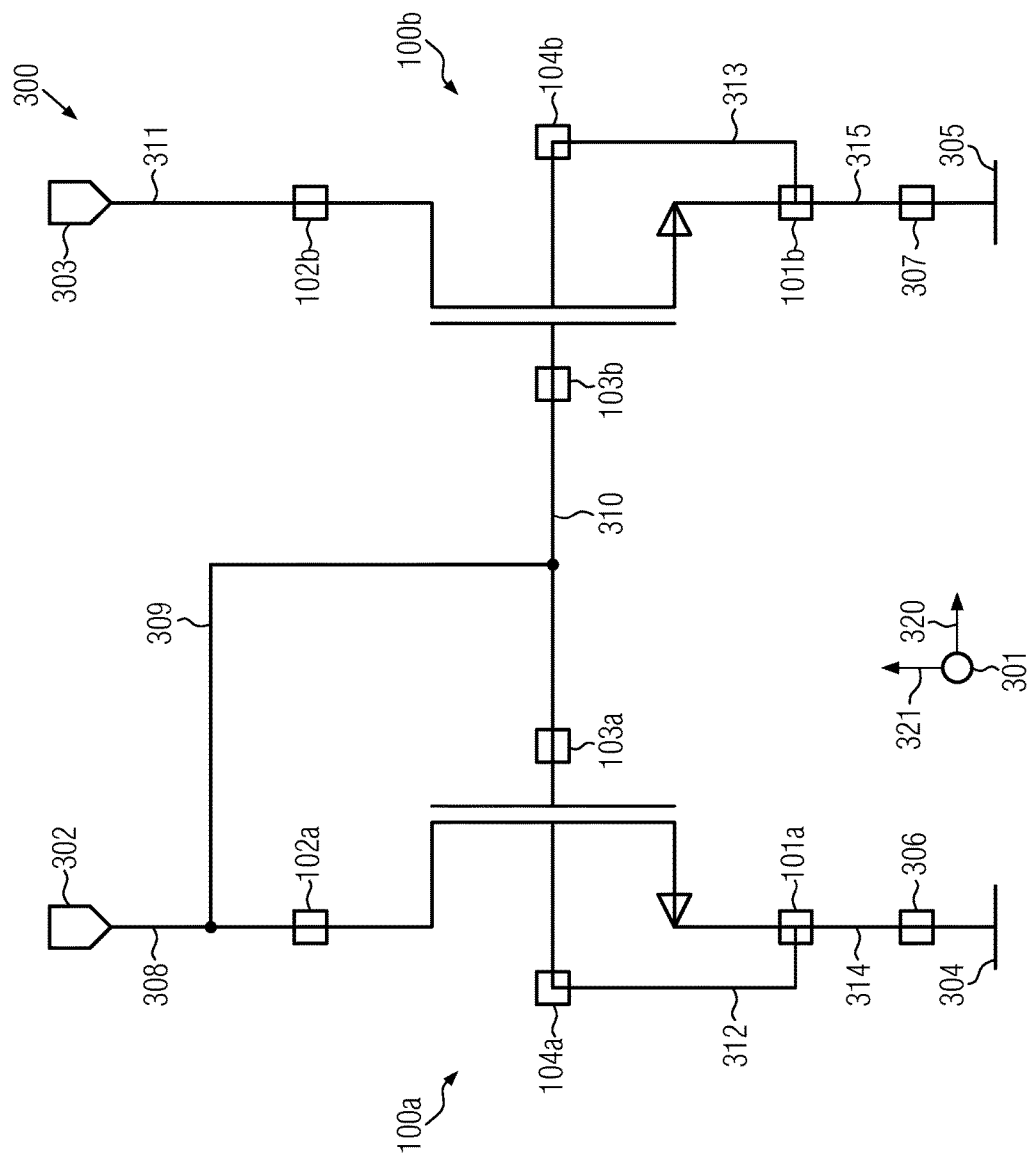
FIG. 3 schematically illustrates a circuit schematic.

The first transistor symbol 100 can be used for providing circuit schematics. FIG. 3 schematically illustrates a circuit diagram 300 of a current mirror circuit. The circuit diagram 300 includes two instances of the first transistor symbol 100, which are denoted by reference numerals 100a and 100b, and represent two N-channel field effect transistors of the current mirror circuit.

In FIG. 3, the source pins of the instances 100a, 100b of the first transistor symbol 100 are denoted by reference numerals 101a and 101b, respectively, the drain pins are denoted by reference numerals 102a and 102b, respectively, the gate pins are denoted by 103a and 103b, respectively, and the body pins are denoted by reference numerals 104a and 104b, respectively. The circuit schematic 300 can be provided in the form of data representing the circuit schematic 300, which can be created by means of a computer program being a tool for the computer-aided design of electronic circuits. For providing the instances 100a, 100b of the first transistor symbol 100, the data representing the circuit schematic 300 can include data that define, for each of the instances 100a, 100b, that an instance of the first transistor symbol 100 is to be included into the circuit schematic, and an instance transformation that maps position vectors in the circuit symbol master coordinate system described above with reference to FIG. 1, which includes the origin 105 and the coordinate axes 108, 109, to position vectors in a schematic coordinate system of the circuit schematic 300. In FIG. 3, reference numeral 301 denotes an origin of the schematic coordinate system. Additionally, the schematic coordinate system can have an x-axis 320 and a y-axis 321. In the plane of drawing of FIG. 3, the x-axis 320 extends in the horizontal direction, and the y-axis extends in the vertical direction.

The instance transformation associated with the instance 100a of the first transistor symbol 100 defines a relationship between positions of elements of the instance 100a such as the pins 101a, 102a, 103a, 104a in the schematic coordinate system and corresponding elements of the first transistor symbol 100 being an instance master symbol of the instance 100a in the circuit symbol master coordinate system. The instance transformation can be a two-dimensional rigid transformation that can include a reflection, a rotation and/or a translation (displacement). Similarly, the instance 100b of the first transistor symbol 100 can have an instance transformation associated therewith, which defines a relationship between positions of elements of the instance 100b, such as positions of the pins 101b, 102b, 103b, 104b of the instance 100b in the schematic coordinate system and positions of corresponding elements of the first transistor symbol 100, such as pins 101, 102, 103, 104 in the circuit symbol master coordinate system. The instance transformation associated with the instance 100b can be a two-dimensional rigid transformation including a reflection, a rotation and/or a translation that is typically different from the instance transformation associated with the instance 100a. Thus, the instances 100a, 100b can be provided at different locations in the circuit schematic 300, and they can have different orientations, as shown in FIG. 3. In the illustrative example of FIG. 3, the instance transformation associated with the instance 100a can define a translation and a reflection at the y-coordinate axis 321. The instance transformation associated with the instance 100b can define a translation only.

In some embodiments, the instance transformation can be provided in the form of an instance orientation matrix $R_i$ and an instance translation vector $t_i$, in accordance with the following equation:

$$q_k = R_i p_k + t_i \qquad (1)$$

Herein $p_k$ denotes a position vector of a k-th one of the pins 101, 102, 103, 104 of the first transistor symbol 100 in the circuit symbol master coordinate system and $q_k$ denotes a position vector of the k-th one of the pins of an i-th instance in the schematic coordinate system. $t_i$ is a two-dimensional instance translation vector associated with the i-th instance of the first transistor symbol 100, and $R_i$ is a 2×2 instance orientation matrix associated with the i-th instance of the first transistor symbol 100, which can define a rotation and/or a reflection. The instance orientation matrix $R_i$ can be expressed as a product $R_i = s_i R_{i,\theta}$ of a reflection matrix $s_i$ and a rotation matrix $R_{i,\theta}$.

In the example illustrated in FIGS. 1 and 3, the instance 100a can be denoted by index i=1 and the instance 100b can be denoted by index i=2. The source pins 101, 101a, 101b can be denoted by index k=1, the drain pins 102, 102a, 102b can be denoted by index k=2, the gate pins 103, 103a, 103b can be denoted by index k=3, and the body pins 104, 104a, 104b can be denoted by index k=4.

In embodiments wherein a circuit schematic including circuit symbols other than transistor symbols is provided, the circuit symbols in the circuit schematic can also be provided in the form of instances of instance master symbols, wherein each instance has an instance transformation associated therewith that maps position vectors in a circuit symbol master coordinate system to position vectors in a schematic coordinate system, wherein the instance transformation is provided in the form of an orientation matrix and a translation vector. Exemplary embodiments wherein circuit symbols other than transistor symbols are used will be described in more detail below.

Positions in the circuit schematic 300 can be provided on a snap grid having a plurality of grid points 107 at a predetermined pitch, similar to the snap grid 106 described above with reference to FIG. 1. For convenience, in FIG. 3, the snap grip has been omitted. Components of the translation vectors of the instance transformations can be constrained to multiples of the pitch of the snap grid and the orientation matrices of the instance transformations can be constrained to matrices defining rotations around rotation angles being multiples of 90°, and reflections about the x-axis and the y-axis. Thus, it can be ensured that positions of the pins 101a, 101b, 102a, 102b, 103a, 103b, 104a, 104b of the instances 100a, 100b are located at grid positions of the snap grid.

The rotation matrices $R_{i,\theta}$ can be matrices of the form $$R_{i,\theta} = \begin{pmatrix} \cos\theta & \sin\theta \\ -\sin\theta & \cos\theta \end{pmatrix}$$

with a rotation angle $\theta$. The reflection matrix can be one of a matrix defining a reflection at the x-axis $$s_i = M_x = \begin{pmatrix} 1 & 0 \\ 0 & -1 \end{pmatrix}$$

a matrix defining a reflection at the y-axis $$s_i = M_y = \begin{pmatrix} -1 & 0 \\ 0 & 1 \end{pmatrix}$$

and a two-dimensional unit matrix if there is no reflection.

Hence, when rotations are constrained to rotation angles $\theta$ being multiples of 90°, each of the elements of the instance orientation matrix $R_i$ has one of the values −1, 0 and 1, so that costly computations of the trigonometric functions $\sin(\theta)$ and $\cos(\theta)$ can be avoided.

The changes of the orientation that are allowable in view of the above-described constraints can be described by a total of eight different instance orientation matrices, which can be denoted as R0, R90, R180, R270, MY, MYR90, MX and MXR90, wherein the letter R followed by a number denotes a rotation around a rotation angle corresponding to the number, MX denotes a reflection at the x-axis and MY denotes a reflection at the y-axis. Thus, in the circuit schematic 300 shown in FIG. 3, the instance transformation associated with the instance 100a can be represented by the instance orientation matrix MY and a translation vector. The instance transformation associated with the instance 100b can be represented by the instance orientation matrix R0 and a translation vector.

In some embodiments, the circuit schematic 300, the first transistor symbol 100 and, optionally, other circuit symbols, can be stored in an OpenAccess database format that can be read by an electronic design automation tool such as, for example, Cadence Virtuoso, or Synopsys Custom Designer. In such embodiments, for each instance of a circuit symbol, the instance transformation can be stored in the form of an OpenAccess string property orient including one of the instance orientation matrix names R0, R90, R180, R270, MY, MYR90, MX, MXR90 to specify the instance orientation matrix $R_i$ and an OpenAccess list property xy including x- and y-components of the instance translation vector $t_i$. The matrices corresponding to the values of the string property orient can be predefined in the OpenAccess database.

In addition to the instances 100a, 100b of the first transistor symbol 100, the circuit schematic 300 can include an input node 302, an output node 303, wires 308 to 315, and source potential connections 304, 305, which represent connections of the current mirror circuit to a source potential VSS, which can be approximately equal to mass potential. The source potential connections 304, 305 can have pins 306, 307, which can have features similar to those of the pins 101a to 104b of the instances 100a, 100b of the first transistor symbol 100.

The input nodes 302, 303, the source potential connections 304, 305 and the wires 308-315 can be stored in accordance with known techniques for the storage of such circuit symbols.

In some embodiments, a scaling can be performed for providing a magnification of coordinates of all objects in the circuit schematic 300, which include the input node 302, the output node 303, wires 308 to 315, and source potential connections 304, 305. Furthermore, a scaling of all coordinates of the first transistor symbol 100, which include coordinates of the pins 101, 102, 103, 104 thereof, and a scaling of the instance translation vectors $t_i$ of the instances 100a, 100b of the circuit symbol 100 can be performed for providing a magnification of the coordinates of the instances 100a, 100b. The scaling of the coordinates can be performed by multiplying each of the coordinates with a common scaling factor. The factor can be an integer multiple of the pitch of the snap grid 106 and the snap grid of the circuit schematic 300, so that the placement of objects of the circuit schematic 300 on the snap grid and the connectivity of the circuit are preserved.

A scaling can be performed if there is a relatively large difference between average sizes of footprints of instance master symbols from a first process design kit, which include the first transistor symbol 100, and average sizes of footprints of instance master symbols from a second process design kit, which include the second transistor symbol 200 that will be described in the following. The footprint area of a circuit symbol is an area including the pins of the circuit symbol.

For example, if the average size of footprints of circuit symbols of the first process design kit is about one half of the average size of footprints of circuit symbols of the second process design kit, a scaling by a factor of two can be performed.

In other embodiments, an adjustment of the grid by means of the scaling factor can be performed. For example, in some embodiments, coordinates can be stored internally in memory as integer numbers in database units plus a common scaling factor defining a conversion between database units and user units. In such embodiments, the common scaling factor can be adjusted for performing a scaling of the circuit schematic and the circuit symbols.

In further embodiments, a scaling can be omitted, even if there are differences between average sizes of footprints of instance master symbols of the first and second process design kits.

For convenience, in the following, a detailed description of scaling will be omitted, and coordinates mentioned in the following can represent scaled coordinates, as well as unscaled coordinates.

Figure 2:
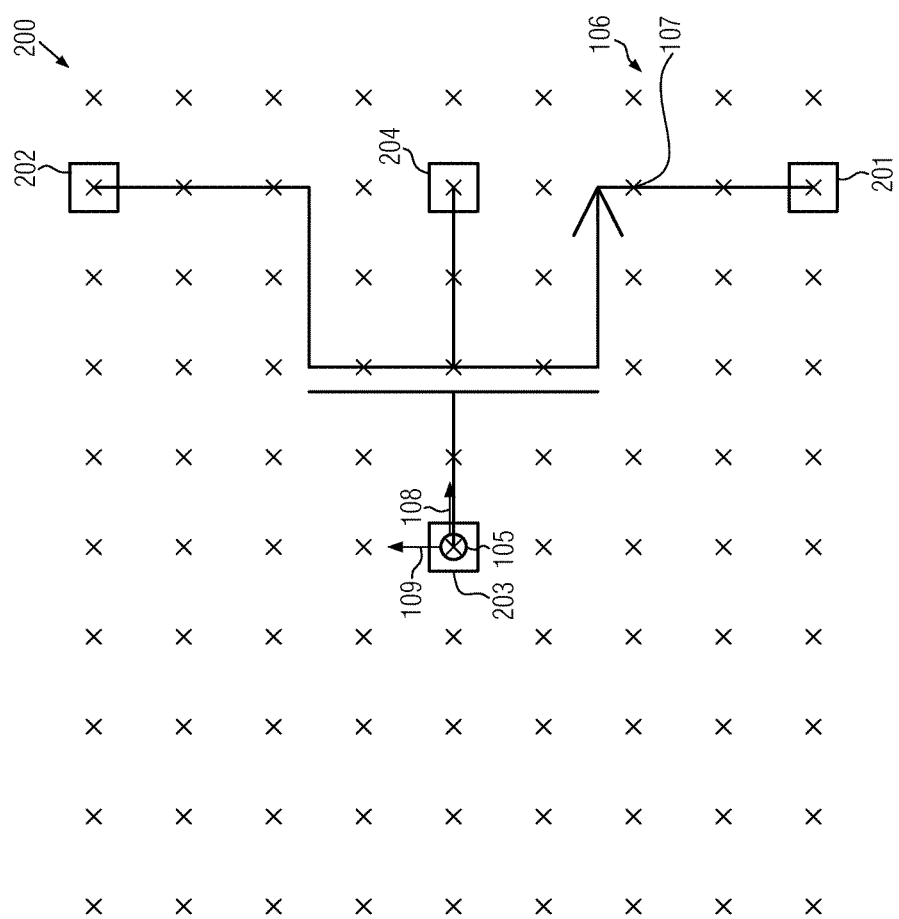

FIG. 2 shows a schematic view of a second transistor symbol 200. For convenience, in FIG. 1, on the one hand, and in FIG. 2, on the other hand, like reference numerals have been used to denote like components. Unless explicitly stated otherwise, components denoted by like reference numerals in FIGS. 1 and 2 can have corresponding features, and a detailed description thereof will sometimes be omitted.

The second transistor symbol 200 can be a symbol for an N-channel field effect transistor that is provided by a second process design kit, wherein the second process design kit is a different process design kit than the first process design kit providing the first transistor symbol 100 described above with reference to FIG. 1. For example, the first process design kit can be a process design kit providing proprietary circuit symbols, and the second process design kit can be a process design kit providing circuit symbols in accordance with a standard, for example, the OpenPDK V1.0 standard.

The second transistor symbol 200 includes a source pin 201, a drain pin 202, a gate pin 203 and a body pin 204, which are pins corresponding to the source pin 101, the drain pin 102, the gate pin 103 and the body pin 104, respectively, of the first transistor symbol 100. Each of the pins 201, 202, 203, 204 can have a size, which is schematically shown as a rectangle in FIG. 2, and a center point, which can have a position corresponding to a center of the square representing the size of the pin. For convenience, the positions of the center points of the pins 201, 202, 203, 204 will sometimes be denoted as positions of the pins herein.

The position of the pins 201, 202, 203, 204 can be defined by position vectors in a master coordinate system having an origin 105 and coordinate axes 108, 109, and the center points of the pins 201, 202, 203, 204 can be located on grid points of a snap grid 106, wherein one of the grid points is schematically denoted by reference numeral 107 in FIG. 2.

The first transistor symbol 100 shown in FIG. 1 and the second transistor symbol 200 shown in FIG. 2 can both be used for denoting a same or similar type of field effect transistor that is provided in a physical implementation of an electronic circuit. However, the transistor symbols 100, 200 can have different features, which relate, in particular, to positions of corresponding pins relative to the circuit symbol master coordinate system, which is further illustrated by FIG. 4.

Figure 4:
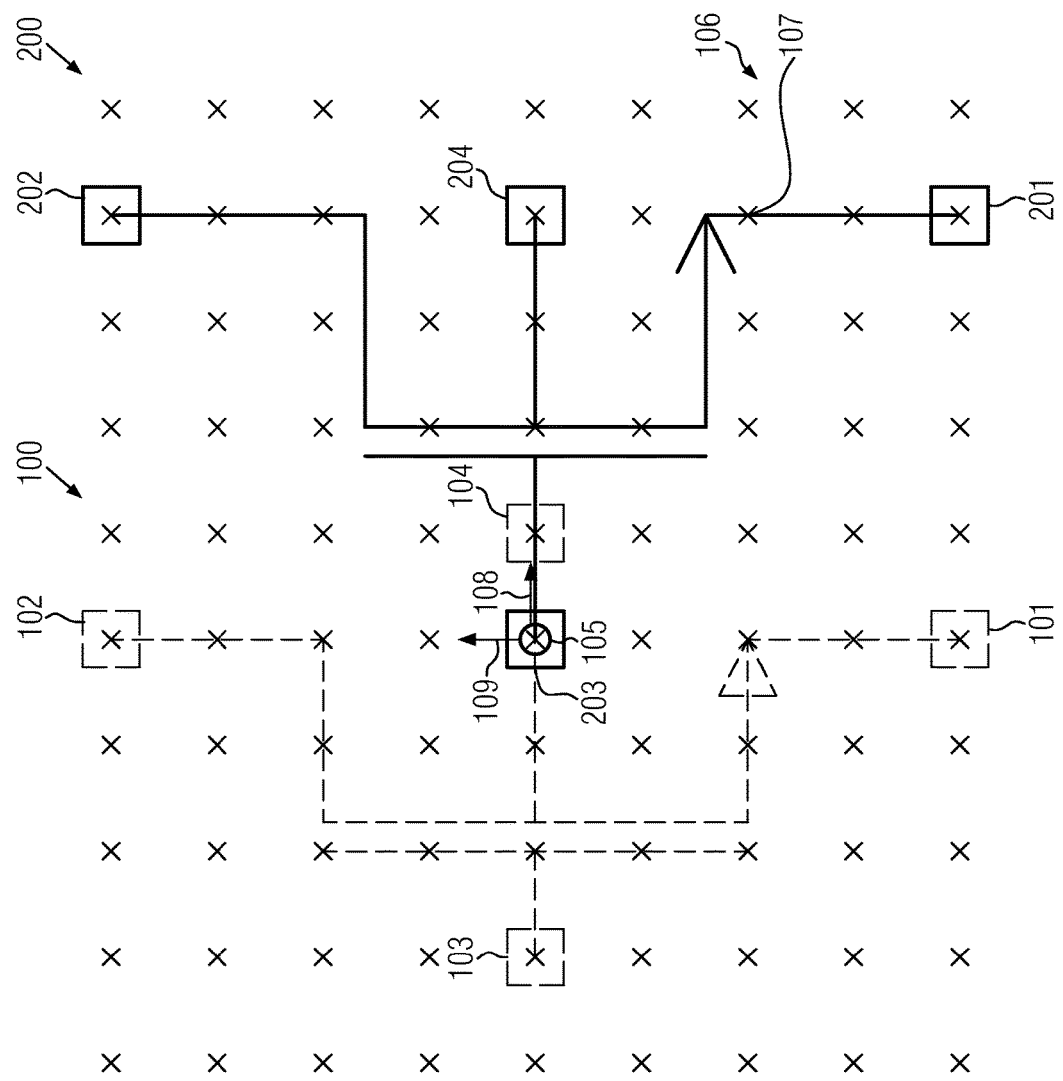
FIG. 4 illustrates an arrangement of the transistor symbols of FIGS. 1 and 2 relative to a circuit symbol master coordinate system.

In FIG. 4, both the first transistor symbol 100 and the second transistor symbol 200 are shown, wherein the first transistor symbol 100 is shown by dashed lines for more clearly distinguishing the first transistor symbol 100 from the second transistor symbol 200. As can be seen from FIG. 4, in the second transistor symbol 200, the positions of the pins 201, 202, 203, 204 are generally shifted relative to the corresponding ones of the pins 101, 102, 103, 104 of the first transistor symbol 100 along the x-axis 108. Additionally, the relative arrangement of the pins of the transistor symbols 100, 200 are also different from each other. While, in the first transistor symbol 100 and in the second transistor symbol 200, the distances between the gate pin and the body pin along the x-direction are substantially equal, in the second transistor symbol 200, the body pin 204 is provided at the same x-coordinate as the source pin 201 and the drain pin 202, whereas, in the first transistor symbol 100, the body pin 104 is provided at a greater x-coordinate than the source pin 101 and the drain pin 102.

If, for converting a circuit schematic such as, for example, the circuit schematic 300 shown in FIG. 3 from the first process design kit providing the first transistor symbol 100 to a second process design kit providing the second transistor symbol 200, only the first transistor symbol 100 providing an instance master symbol for the instances 100a, 100b were replaced by the second transistor symbol 200, and the instance transformations of the instances 100a, 100b were applied to the second transistor symbol 200, the thus-obtained instances of the second transistor symbol 200 would have pins at different locations than the pins 101a to 104b of the instances 100a, 100b of the first transistor symbol 100. Thus, positions of the pins of the instances of the second transistor symbol 200 and positions of ends of the wires 308 to 315 (see FIG. 3) providing connections thereto would no longer match.

In some embodiments, an adjustment transformation can be determined that maps position vectors to transformed position vectors. In some embodiments, the adjustment transformation can be adapted to transform position vectors in the circuit symbol master coordinate system to transformed position vectors in the circuit symbol master coordinate system, and it can be adapted so that positions of the pins of a second circuit symbol, such as, for example, the second transistor symbol 200, when transformed with the adjustment transformation, are close to positions of corresponding pins of a first circuit symbol such as, for example, the first transistor symbol 100, or substantially equal thereto. In some embodiments, the adjustment transformation can be determined once for each pair of circuit symbols of the first process design kit and the second process design kit, respectively, which represent a particular circuit element.

For converting a circuit schematic from the first process design kit that includes the first circuit symbol to the second process design kit that includes the second circuit symbol, for each instance of the first circuit symbol, an instance transformation of an instance of the second circuit symbol that is to replace the instance of the first circuit symbol can be determined by concatenating the adjustment transformation and the instance transformation of the instance of the first circuit symbol. The instance transformation of the instance of the second circuit symbol can correspond to a combination of the adjustment transformation and the instance transformation of the instance of the first circuit symbol, wherein the adjustment transformation is performed before the instance transformation for the first circuit symbol. Thus, instances of the second circuit symbol can be provided wherein the pins of the instances of the second circuit symbol in the circuit schematic are at least close to the pins of the instances of the first circuit symbol in the original circuit diagram.

If there are differences between pin positions of the thus-obtained instances of the second circuit symbol and pin positions of the original instances of the first circuit symbol, wire segments can be included into the circuit schematic for maintaining the electrical connectivity of the circuit. In some embodiments, data representing one or more wire segments can be determined once for each circuit symbol in the circuit symbol master coordinate system, and then instances thereof can be provided, wherein, for each instance, positions of the wire segments determined in the circuit symbol master coordinate system are transformed into the schematic coordinate system by means of the instance transformation of the first circuit symbol.

Furthermore, in some embodiments, checks of a connectivity of the circuit represented by the circuit schematic can be performed to ensure that the connectivity of the circuit represented by the circuit schematic has not been adversely affected by the replacement of instances of first circuit symbols with instances of second circuit symbols and the providing of instances of wire segments.

In the following, such techniques will be described in more detail with reference to FIGS. 12 and 13.

Figure 12:
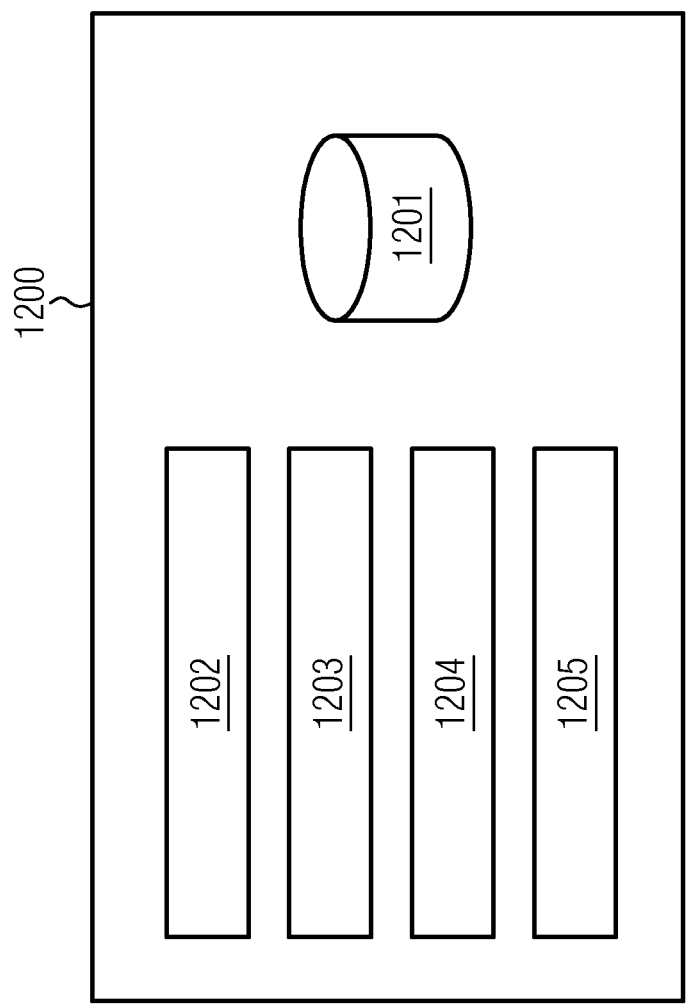
FIG. 12 schematically illustrates a system described herein.

FIG. 12 shows a schematic view of a system 1200 according to an embodiment. The system 1200 can be provided in the form of a computer or a plurality of computers that are connected by a network which is/are equipped with one or more computer programs that include code for causing the one or more computers for performing methods according to embodiments. The one or more computer programs can be provided in the form of a tangible computer-readable storage medium such as a CD-ROM, a DVD-ROM, a hard disc and/or a solid state storage medium, or they can be provided to the one or more computers via a network connection. In some embodiments, the one or more computer programs can be implemented using a programming language such as Cadence SKILL to operate on an OpenAccess schematic design database for each instance of the circuit schematic. Lower level OpenAccess functions which can be implemented in C++, or a scripting language such as TCL, Python and/or Perl can also be used for operating on the schematic design database. In some embodiments, matrix calculations that will be described in more detail below can be implemented in a programming language that is particularly adapted for matrix calculations such as GNU Octave and/or Matlab. Computed orientation matrices, translation vectors and/or error vectors can be formatted as program instructions, for example in the Cadence SKILL language, to export subroutines, links and/or plugins to a main schematic translation procedure.

The system 1200 can include a memory 1201, wherein data representing circuit symbols and circuit schematics can be stored, for example, by means of an OpenAccess database.

The system 1200 can further include an adjustment transformation calculator 1202, a wire inserter 1203 and a circuit schematic modifier 1204. Additionally, the system 1200 can include a connectivity checker 1205. The adjustment transformation calculator 1202, the wire inserter 1203, the circuit schematic modifier 1204 and the connectivity checker 1205 can be provided in the form of computer programs and/or modules of computer programs that can be implemented as described above.

In the following, methods according to embodiments, which can be performed by means of the system 1200, will be described with reference to FIG. 13, which shows a schematic flow diagram 1300 of a method according to an embodiment.

At 1301, a first and a second process design kit can be provided. Each of the first and the second process design kit can include one or more instance master symbols for circuit elements. In some embodiments, the first process design kit can include the first transistor symbol 100 shown in FIG. 1, and the second process design kit can include the second transistor symbol 200 shown in FIG. 2. Additionally, each of the first and the second process design kits can include instance master symbols for other circuit elements, examples of which will be described below. The process design kits can be stored in the memory 1201 of the system 1200.

At 1302, adjustment transformations can be calculated according to at least some of the method disclosed herein, wherein an adjustment transformation can be calculated for each of one or more pairs of circuit elements, wherein each pair of circuit elements includes a first circuit element, which can be an instance master symbol from the first process design kit, and a second circuit element, which can be an instance master symbol from the second process design kit. In particular, the first transistor symbol 100 and the second transistor symbol 200 can form a pair of circuit symbols. The calculation of the adjustment transformations can be performed by the adjustment transformation calculator 1202 of the system 1200. The calculation of the adjustment transformation can be performed once for pairs of circuit elements of a common symbol footprint class, such as field effect transistors, resistors and capacitors, and need not be performed separately for circuit symbols of a same symbol footprint class having different symbol names, which can be used for further specifying the circuit elements represented by the circuit symbols.

In one embodiment, the adjustment transformation can include a reflection, a rotation and/or a translation, wherein the reflection and/or the rotation can be represented by an orientation matrix $R_a$, and the translation can be represented by a translation vector $t_a$. Similar to the orientation matrix $R_i$ and the translation vector $t_i$ of the instance transformation described above, the orientation matrix $R_a$ of the adjustment transformation can be a 2×2 matrix, and the translation vector $t_a$ of the adjustment transformation can be a two-dimensional vector.

Thus, in one example, a transformed position vector $r_k'$ can be obtained in accordance with the following equation:

$$r'_k = R_a p'_k + t_a \quad (2)$$

wherein $p_k'$ denotes a position vector to which the adjustment transformation is applied, which can be a position vector defining a position of a k-th one of the pins of the second circuit symbol. In the example wherein the second circuit symbol is the second transistor symbol 200, the position vectors $p_k'$ can define positions of the pins 201, 202, 203, 204, wherein the individual pins 201, 202, 203, 204 are denoted by the index k. In some embodiments, the index k=1 can denote the source pin 201, the index k=2 can denote the drain pin 202, the index k=3 can denote the gate pin 203 and the index k=4 can denote the body pin 204. The assignment of indices k to pins of the transistor symbols 100, 200 can be selected such that corresponding pins of the transistor symbols 100, 200 have the same index k. Herein, pins are denoted as "corresponding pins" if they represent connections to the circuit element represented by a circuit symbol that has the same function. For example, the source pin 201 of the second transistor symbol 200 can correspond to the source pin 101 of the first transistor symbol, the drain pin 202 can correspond to the drain pin 102, the gate pin 203 can correspond to the gate pin 103 and the body pin 204 can correspond to the body pin 104.

The orientation matrix $R_a$ and the translation vector $t_a$ can be adapted so as to minimize an error measure E, wherein the error measure E can be calculated in accordance with the following equation:

$$E = \Sigma_{k=1}^{n} |e_k|^2 \text{ wherein } e_k = r'_k - p_k \quad (3)$$

Herein, n denotes the number of the pins of the first circuit symbol and the second circuit symbol. In embodiments wherein the first circuit symbol is the first transistor symbol 100 and the second circuit symbol is the second transistor symbol 200, n=4. $e_k$ is an error vector for the k-th one of the pins of the first circuit symbol and the second circuit symbol that is a difference between the transformed position vector $r_k'$ and the position vector $p_k$ defining the position of the k-th pin of the first circuit symbol. Accordingly, the error measure E includes a sum over the plurality of first pins of the deviation between the transformed position vector that is obtained by applying the adjustment transformation to the second position vector associated with the second pin corresponding to the first pin and the first position vector associated with the first pin. The deviation includes a square of a vector norm of the difference between the transformed position vector and the first position vector associated with the first pin.

Similar to the orientation matrix and the translation vector of the instance transformation described above, the orientation matrix $R_a$ and the translation vector $t_a$ can be adapted such that the transformed position vectors $r_k'$ match the snap grid 106. The components of the translation vector $t_a$ can be multiples of the pitch of the snap grid 106, and the orientation matrix $R_a$ can be adapted to provide a combination of a rotation about a rotation angle being a multiple of 90 degrees and a reflection at one of the x-axis 108 and the y-axis 109.

Accordingly, the adjustment transformation can be adapted so that the error measure E is minimized subject to the constraint that the transformed position vectors $r_k'$ match the snap grid.

In the following, illustrative techniques that can be used for calculating the adjustment transformation and which are based on a singular value decomposition will be described. As will be detailed in the following, these techniques need not include an explicit calculation of the error measure E. However, these methods can yield an adjustment transformation that minimizes the error measure E subject to the constraint that the transformed position vectors $r_k'$ match the snap grid. Accordingly, an adjustment transformation which is calculated as described in the following is to be understood as an adjustment transformation that minimizes the error measure E as defined above in Equation 3.

Vectors $a_k$ can be calculated in accordance with the following equation:

$$a_k = p_k - \bar{p} \tag{4}$$

wherein $\bar{p}$ denotes a mean of the first position vectors $p_k$.

Additionally, vectors $b_k$ can be calculated in accordance with the following equation:

$$b_k = p_k' - \bar{p}' \tag{5}$$

wherein $\bar{p}'$ denotes a mean of the position vectors $p_k'$.

The vectors $a_k$ and $b_k$ can then be used for forming a first pin position matrix A and a second pin position matrix B, in accordance with the following equations:

$$A = (a_1, a_2, \ldots, a_n)^T = \begin{pmatrix} a_{1,x} & a_{1,y} \\ a_{2,x} & a_{2,y} \\ \vdots & \vdots \\ a_{n,x} & a_{n,y} \end{pmatrix} \tag{6}$$

$$B = (b_1, b_2, \ldots, b_n)^T = \begin{pmatrix} b_{1,x} & b_{1,y} \\ b_{2,x} & b_{2,y} \\ \vdots & \vdots \\ b_{n,x} & b_{n,y} \end{pmatrix} \tag{7}$$

The pin position matrices A and B can be matrices having two columns and a number of rows equal to the number of pins of the first circuit symbol and the second circuit symbol. The rows of the first pin position matrix A include components of vectors that are obtained by subtracting the mean of the position vectors $p_k$ from the position vectors $p_k$, and the rows of the second pin position matrix B include components of vectors that are obtained by subtracting the mean of the position vectors $p_k'$ from the first position vectors $p_k$.

In some embodiments, the matrices A and B can have a number of rows that is greater than the number of pins of the first circuit symbol and the second circuit symbol, for example, a number of rows equal to one plus the numbers of pins of the first circuit symbols and the second circuit symbols. In some cases of fully symmetric circuit symbols, there can be two solutions for the orientation matrix $R_a$ (rotation and reflection) leading to the same error measure. In such cases, one of the solutions, for example, a solution that reduces the risk of electrical shorts of wires in the circuit schematic, can be enforced by duplicating position vectors for at least one of the pins, which can change the mean of the position vectors, thus breaking the symmetry.

A pseudoinverse of one of the of the matrices A and B, in particular, a pseudoinverse $A^+$ of the matrix A, can be calculated. In some embodiments, this can be done by means of a singular value decomposition of the matrix A, wherein matrices U, W, and V are calculated, so that:

$$A = UWV^T \tag{8}$$

wherein U is an orthogonal matrix having n columns and two rows, W is a diagonal matrix having two columns and two rows, and wherein the diagonal elements of the matrix W are the singular values of the matrix A, and V is an orthogonal matrix having two columns and two rows.

The singular value decomposition of the matrix A can be calculated using well-known numerical techniques for the calculation of a singular value decomposition.

From the singular value decomposition of the matrix A, the pseudoinverse $A^+$ can be calculated in accordance with the following equation:

$$A^+ = VW^+U^T \tag{9}$$

wherein $W^+$ is a diagonal matrix having two rows and two columns, wherein the diagonal elements of the matrix $W^+$ can be calculated from the diagonal elements of the matrix W by calculating the inverse of each diagonal element of the matrix W that is substantially different from zero and providing the inverse as one diagonal element of the matrix $W^+$, and providing a diagonal element of the matrix $W^+$ for each diagonal element of the matrix W that is substantially equal to zero. Techniques for calculating a pseudoinverse of a matrix by means of the singular value decomposition of the matrix are known.

Then, a preliminary adjustment orientation matrix $R_{a,p}$ and a preliminary translation vector $t_{a,p}$ can be calculated in accordance with the following equations:

$$R_{a,p} = A^+ B \tag{10}$$

$$t_{a,p} = -R_{a,p}\bar{p} + \bar{p}' \tag{11}$$

Thereafter, the adjustment orientation matrix $R_a$ and the adjustment translation vector $t_a$ of the adjustment transformation (see Equation 2) can be calculated by rounding the preliminary adjustment orientation matrix $R_{a,p}$ to one of a plurality of predetermined constrained orientation changes, and by rounding the preliminary adjustment translation vector $t_{a,p}$ to the snap grid 106. The plurality of predetermined constrained orientation changes can include rotations around angles that are multiples of 90 degrees and reflections at one of the x-axis 108 and the y-axis 109.

As detailed above, when rotations are constrained to rotations around angles that are multiples of 90°, each of the elements of the instance rotation matrix has one of the values −1, 0 and 1. In such embodiments, the adjustment orientation matrix $R_a$ can be obtained by rounding each of the elements of the preliminary adjustment orientation matrix $R_{a,p}$ to a closest one of the values −1, 0 and 1. The thus-obtained adjustment orientation matrix $R_a$ can then be mapped to one of the eight predefined orientation names R0, R90, R180, R270, MY, MYR90, MX, MXR90 of the OpenAccess string property orient for storage in the Open Access database.

The adjustment translation vector $t_a$ can be obtained from the preliminary adjustment translation vector $t_{a,p}$ by rounding each of the components of the preliminary adjustment translation vector $t_{a,p}$ to an integer multiple of the pitch of the snap grid.

Figure 5:
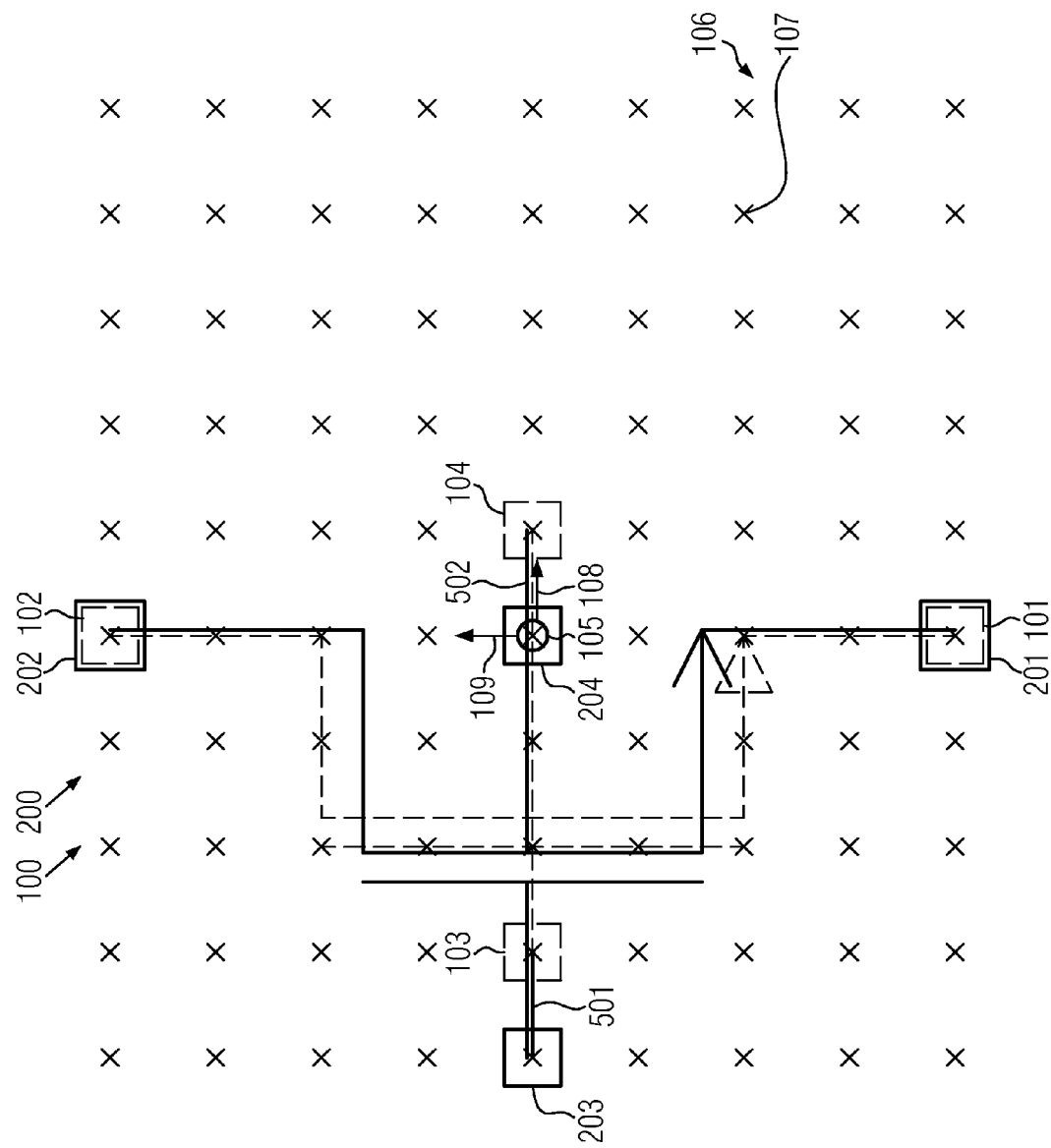
FIG. 5 schematically illustrates the arrangement of the transistor symbols of FIGS. 1 and 2 relative to the circuit symbol master coordinate system after applying an adjustment transformation to one of the transistor symbols.

FIG. 5 shows the first transistor symbol 100 and the second transistor symbol 200, wherein the first transistor symbol 100 is shown at the original position relative to the circuit symbol master coordinate system having origin 105 and coordinate axes 108, 109, whereas the arrangement of the second transistor symbol 200 relative to the circuit symbol master coordinate system has been changed in accordance with the adjustment transformation described herein. Similar to FIG. 4, in FIG. 5, the first transistor symbol 100 is shown by dashed lines and the second transistor symbol 200 is shown by solid lines for more clearly distinguishing the transistor symbols 100, 200.

As can be seen by comparison of FIG. 5 with FIG. 4, wherein both transistor symbols 100, 200 are shown at their original locations relative to the circuit symbol master coordinate system, in the illustrative example, the adjustment transformation includes no rotation but a translation in a direction that is opposite to the direction of the x-axis 108. In the original arrangement of the second transistor symbol 200 relative to the circuit symbol master coordinate system, the gate pin 203 is located at the origin 105. After applying the adjustment transformation to positions of the elements of the second transistor symbol 200, which include the pins 201, 202, 203, 204, the body pin 204 of the second transistor symbol 200 is located at the origin 105.

As can be seen from FIG. 5, the adjustment transformation maps the position vectors in the circuit symbol master coordinate system that define the positions of the source pin 201 and the drain pin 202 of the second transistor symbol 200 to transformed position vectors that are substantially equal to the position vectors defining the positions of the source pin 101 and the drain pin 102, respectively, of the first transistor symbol 100. Accordingly, after applying the adjustment transformation, the position of the center point of the source pin 201 matches the position of the center point of the source pin 101, and the position of the center point of the drain pin 202 matches the position of the center point of the drain pin 102.

However, since, in the second transistor symbol 200, the arrangement of the gate pin 203 and the body pin 204 relative to the source pin 201 and the drain pin 202 is different from the arrangement of the gate pin 103 and the body pin 104 relative to the source pin 101 and the drain pin 102 in the first transistor symbol 100, even after the application of the adjustment transformation, the positions of the center points of the gate pin 103 and the gate pin 203 do not match. Furthermore, the positions of the center points of the body pin 104 and the body pin 204 do not match.

The matching between the arrangement of the pins 101, 102, 103, 104 of the first transistor symbol 100 and the arrangement of the pins 201, 202, 203, 204 of the second transistor symbol 200 that is obtained after transforming position vectors defining their positions by means of the adjustment transformation can be expressed in terms of the error vectors $e_k$ (see equations (2) and (3)). In the example illustrated in FIG. 5, an error vector $e_1$ for the source pins 101, 201 and an error vector $e_2$ for the drain pins 102, 202 can have components that are equal to zero. An error vector $e_3$ for the gate pins 103, 203, being a vector that points from the position of the gate pin 103 to the adjusted position of the gate pin 203 that is obtained after applying the adjustment transformation can have a y-component of zero and an x-component corresponding to the distance between the pins 203, 103 shown in FIG. 5. An error vector $e_4$ for the body pins 104, 204, being a vector that points from the position of the body pin 104 to the adjusted position of the body pin 204 that is obtained after applying the adjustment transformation, can have a y-component of zero and an x-component corresponding to the distance between the pins 204, 104 illustrated in FIG. 5. In the illustrative example shown in FIG. 5, the x-components of the error vectors $e_3$ and $e_4$ can have negative values.

Figure 13:
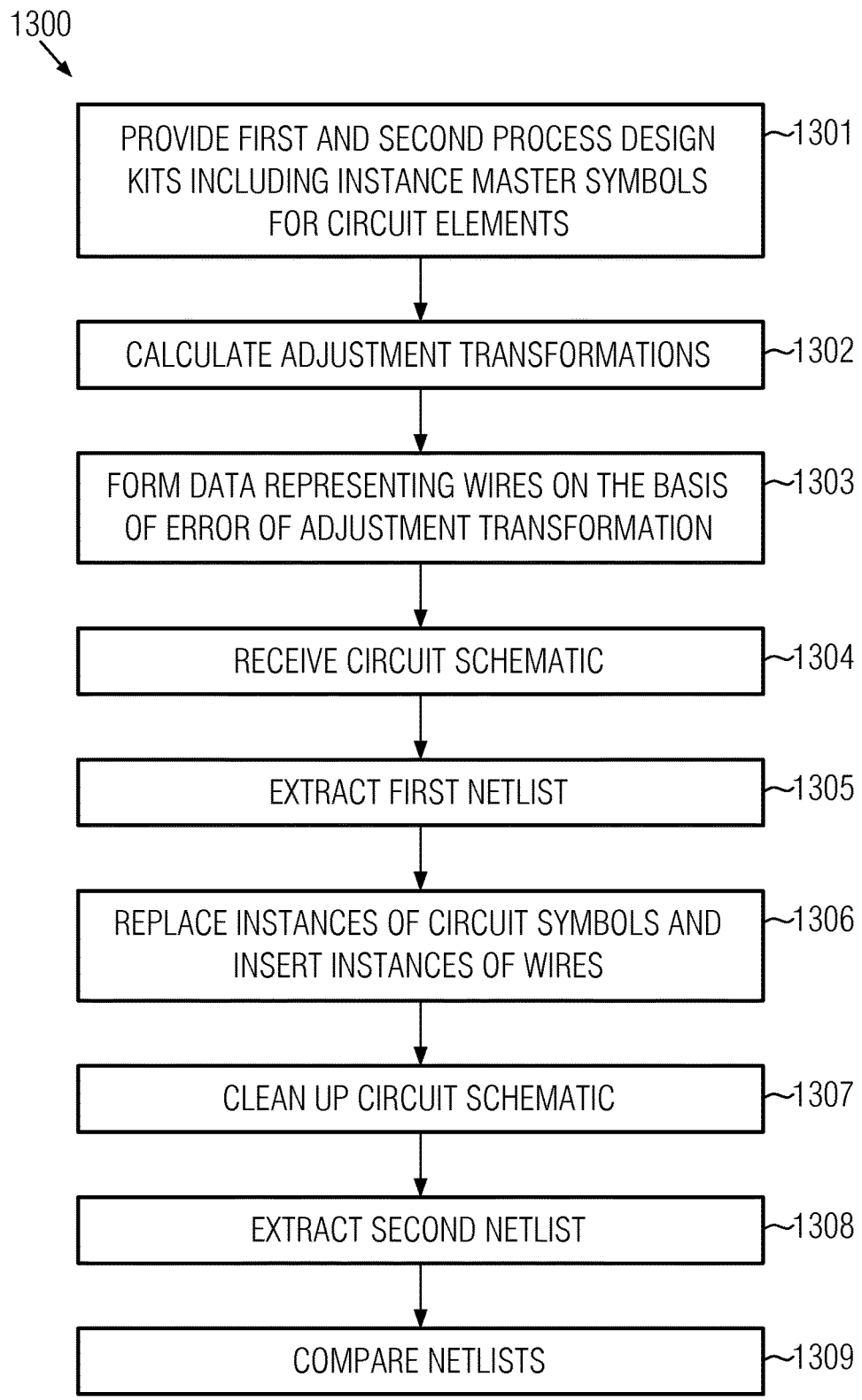
FIG. 13 shows a flow diagram illustrating methods described herein.

Further referring to FIG. 13, at 1303, in one illustrative embodiment, data representing wire segments can be formed on the basis of an error of the matching between the positions of the pins of the second circuit symbol that are obtained after applying the adjustment transformation and the positions of the pins of the first circuit symbol. This can be done by the wire inserter 1203 of the system 1200. For each pair of pins that includes a pin of the first circuit symbol and a corresponding pin of the second circuit symbol, the error vector $e_k$ can be calculated in accordance with equations (2) and (3). If all of the components of the error vector $e_k$ are approximately zero, no wire segment needs to be provided. If at least one of the components of the error vector is different from zero, a wire can be provided for the pair of pins. The wire can connect a position represented by the transformed position vector that is obtained by applying the adjustment transformation to the position vector associated with the pin of the second circuit element with a position that is represented by the position vector associated with the pin of the first circuit element. The wire can have a first end point at the position of the pin of the first circuit element, having coordinates corresponding to the position vector associated with the pin of the first circuit element, and a second end point at the position of the pin of the second circuit element, having coordinates that can be obtained by adding the error vector calculated for the pair of pins to the position vector associated with the pin of the first circuit element. The wire can be provided in the form of one or two wire segments, wherein one wire segment connecting the end points of the wire can be provided if only one of the components of the error vector is different from zero, and two wire segments, one of them extending in the direction of the x-axis 108 and the other extending in the direction of the y-axis 109, can be provided if both components of the error vector are different from zero. Thus, an orthogonal (Manhattan) wiring can be provided.

If two wire segments are provided, there can be two possibilities for providing the wiring, one of them being to provide the wire segment extending in the direction of the x-axis at the first endpoint of the wire, and to connect the wire segment extending in the direction of the y-axis thereto so that it extends to the second endpoint of the wire. Another possibility is providing the wire segment extending in the direction of the y-axis at the first endpoint of the wire, and connecting the wire segment extending in the direction of the x-axis thereto so that it extends to the second endpoint. In some embodiments, a manual input by a user can be provided to select one of these two possibilities, for example, in order to substantially avoid or reduce a risk of intersections of the wire segments with pins and wires thereto, which might create electric shorts and undesirable changes of the connectivity of the electric circuit.

In the illustrative example of FIG. 5, a wire 501 can be provided that connects the positions of the gate pins 103, 203, and a wire 502 can be provided that connects the positions of the body pins 104, 204. Since the error vectors $e_3$ and $e_4$ for the gate pins 103, 203 and the body pins 104, 204 each have only one non-zero component, each of the wires 501, 502 can include a single wire segment that extends along the direction of the x-axis 108.

Further referring to FIG. 13, at 1304, a circuit schematic can be received by the system 1200, for example, the circuit schematic 300 described above with reference to FIG. 3. As detailed above, the circuit schematic 300 can be provided in the form of data that define, for each of the instances 100a, 100b of the first transistor symbol 100, an instance transformation that can include an instance orientation matrix $R_i$ and an instance translation vector $t_i$.

In one illustrative embodiment, at 1305, a first netlist of the circuit schematic 300 can be extracted. This can be done by the connectivity checker 1205 of the system 1200. The first netlist can describe the connectivity of the components of the circuit schematic, for example, the components of the current mirror circuit described by the circuit schematic 300, which includes two N-channel field effect transistors, which are represented by the instances 100a, 100b of the first transistor symbol 100, electrical connections which are represented by the wires 308 to 315, and connections of the current mirror circuit to other circuits which are represented by the input 302, the output 303 and the source potential connections 304, 305. Different from the circuit schematic 300, the first netlist need not include information defining positions of elements of the circuit schematic 300 that represent circuit elements. Accordingly, extracting a netlist from two different circuit schematics that define the same electrical circuit can yield substantially identical netlists.

Figure 6:
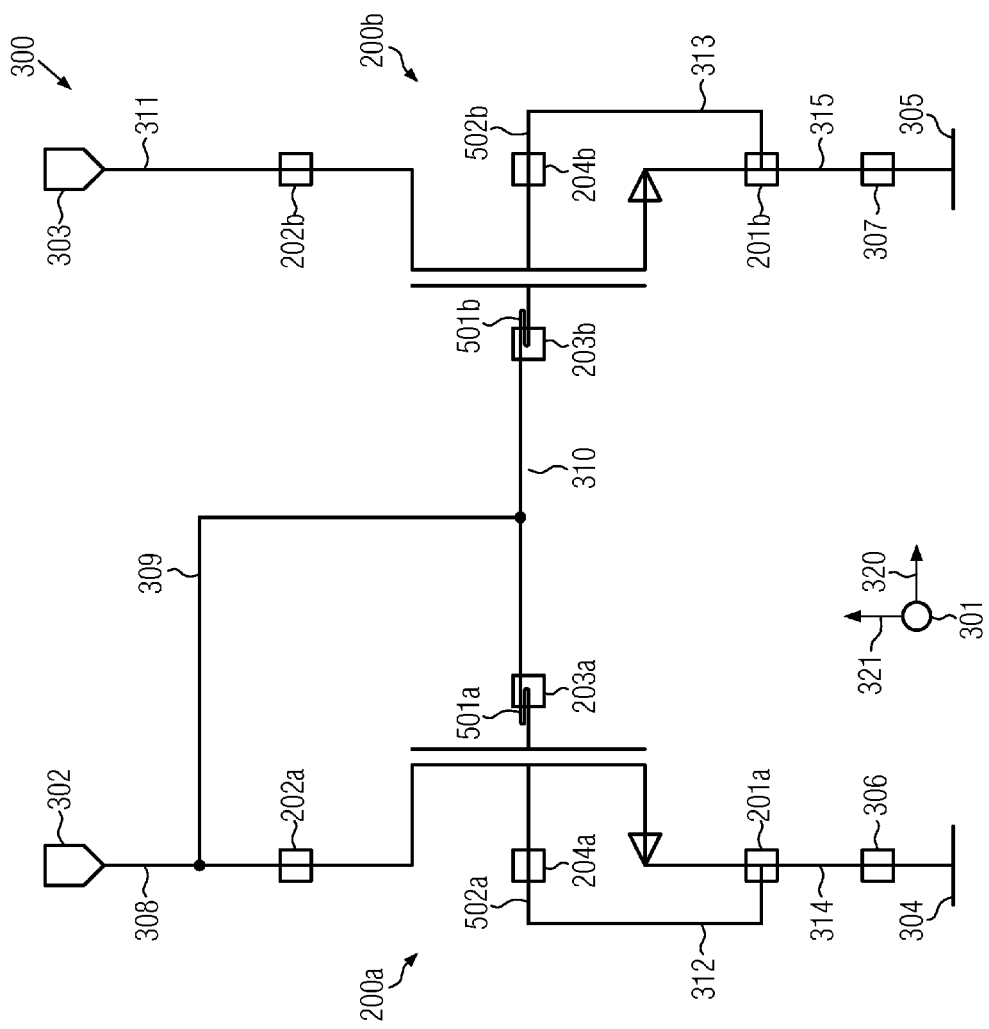
FIG. 6 shows the circuit schematic of FIG. 3 after a replacement of transistor symbols.

In one illustrative embodiment, at 1306, each of the instances 100a, 100b of the first transistor symbol 100 can be replaced with a respective instance of the second transistor symbol 200. This can be done by the circuit schematic modifier 1204 of the system 1200. FIG. 6 shows the circuit schematic 300 after the replacement of the instance 100a of the first transistor symbol 100 with an instance 200a of the second transistor symbol 200, and the replacement of the instance 100b of the first transistor symbol 100 with an instance 200b of the second transistor symbol 200. In FIG. 6, reference numerals 201a, 202a, 203a, 204a denote pins of the instance 200a corresponding to the pins 201, 202, 203, 204 of the second transistor symbol 200, and reference numerals 201b, 202b, 203b, 204b denote pins of the instance 200b corresponding to the pins 201, 202, 203 and 204, respectively, of the second transistor symbol 200.

For performing the replacement of the instances 100a, 100b of the first transistor symbol 100 with the instances 200a, 200b of the second transistor symbol 200, an instance transformation can be provided for each of the instances 200a, 200b of the second transistor symbol 200. Each of the instance transformations can include an instance orientation matrix $R_i'$ and an instance translation vector $t_i'$, wherein the index i denotes the instance of the second transistor symbol 200. For example, the index i=1 can be used to denote the instance 200a, and the index i=2 can be used to denote the instance 200b, in accordance with the indices i used to denote the instances 100a, 100b of the first transistor symbol 100. The instance transformations can be provided on the basis of the adjustment transformation calculated at 1302, and the instance transformation of the corresponding instance of the first transistor symbol 100, in accordance with the following equations:

$$R'_i = R_i R_a \quad (12)$$

$$t'_i = R_i t_a + t_i \quad (13)$$

which can be done by first storing and reverting the instance transformation of the instance of the first transistor symbol 100, applying the adjustment transformation to an instance of the second transistor symbol 200, and then applying the stored instance transformation of the instance of the first transistor symbol 100 thereto. In doing so, a concatenation of the adjustment transformation and the stored instance transformation can be obtained.

Using the instance orientation matrix $R_i'$ and the instance translation vector $t_i'$ of the instance transformation of an instance of the second transistor symbol 200, position vectors $q_k'$ representing positions of the pins of the instance of the second transistor symbol 200 in the schematic coordinate system including the origin 301 and the coordinate axis 320, 321 can be calculated in accordance with the following equation:

$$q'_k = R'_i p'_k + t'_i \quad (14)$$

In the replacement of the instance 100a of the first transistor symbol 100 with the instance 200a of the second transistor symbol 200, the data representing the instance 100a can be replaced with data representing the instance 200a, which can include information that an instance of the second transistor symbol 200 is to be provided, as well as the instance transformation for the instance 200a, which can include an instance orientation matrix and an instance transformation vector in accordance with equations (12) and (13).

Similarly, in the replacement of the instance 100b of the first transistor symbol with the instance 200b of the second transistor symbol 200, the data representing the instance 100b can be removed, and data representing the instance 200b can be provided, which include an instance transformation for the instance 200b. Additionally, for each of the instances 200a, 200b of the second transistor symbol 200, instances of the wires 501, 502 can be provided in the circuit schematic 300. In FIG. 6, reference numerals 501a and 502a denote instances of the wires 501, 502 associated with the instance 200a of the second transistor symbol 200, and the reference numerals 501b, 502b denote instances of the wires 501, 502 associated with the instance 200b.

For providing the instances 501a, 502a of the wires 501, 502, the stored instance transformation for the instance 100a of the first transistor symbol 100 can be applied to position vectors defining positions of the endpoints of the wire segments wires 501, 502 in the circuit symbol master coordinate system to obtain position vectors defining endpoints of wire segments of the instances 501a, 502a in the schematic coordinate system. Then, data defining wire segments of the instances 501a, 502a can be provided on the basis thereof. Similarly, for providing the instances 501b, 502b of the wires 501, 502, the stored instance transformation for the instance 100b of the first transistor symbol 100 can be applied to the position vectors defining the positions of the endpoints of the wires 501, 502 in the circuit symbol master coordinate system to obtain position vectors defining endpoints of wire segments of the instances 501b, 501b in the schematic coordinate system. Then, data defining wire segments of the instances 501b, 502b can be provided on the basis thereof.

The instances 501a, 501b can provide connections between the pins 203a, 203b and the wire 310. The wire 502a can provide a connection between the body pin 204a and the wire 312, and the wire 502b can provide a connection between the body pin 204b and the wire 313. The source pins 201a, 201b, which are provided at substantially the same locations as the source pins 101a, 101b, can be directly connected to wires 314 and 315, respectively. Similarly, the drain pins 102a, 102b, which are provided at substantially the same locations as the drain pins 202a and 202b, respectively, can be directly connected to wires 308, 311.

Accordingly, the instances 200a, 200b of the second transistor symbol 200 can be connected to the wires of the circuit schematic 300 in substantially the same manner as the instances 100a, 100b of the first transistor symbol 100 so that the connectivity of the circuit is maintained.

Referring to FIG. 13 again, after the replacement of the instances 100a, 100b of the first transistor symbol 100 with the instances 200a, 200b of the second transistor symbol 200, and after the insertion of the wires 501a, 501b, 502a, 502b, in some embodiments, at 1307, a cleanup of the circuit schematic 300 can be performed. The cleanup of the circuit schematic 300 can include a removal of floating (outreaching) wire stubs that are connected at only one end. Wire stubs typically do not change the connectivity of the electric circuit. However, removing wire stubs can help to improve a readability of the circuit schematic by users. For removing the wire stubs, the wire stubs can be flagged by means of a function provided by a conventional electronic design automation tool such as Cadence SKILL, and removed by a delete function provided by the electronic design automation tool. In other embodiments, the cleanup of the circuit schematic 300 can be omitted.

Referring to FIG. 13 again, at 1308, a second netlist of the circuit schematic 300 can be extracted, wherein the second netlist is extracted from the circuit schematic 300 as obtained after the replacement of the instances 100a, 100b of the first transistor symbol 100 with the instances 200a, 200b of the second transistor symbol 200, after the insertion of the wires 501a, 501b, 502a, 502b and, if a cleanup of the circuit schematic 300 has been performed, after the cleanup of the circuit schematic 300. This can be done by the connectivity checker 1205 of the system 1200.

Thereafter, at 1309, the first netlist and the second netlist can be compared to determine if any errors have been introduced into the circuit schematic 300 or if the circuit schematic 300 still correctly represents the current mirror circuit, for example, by means of the connectivity checker 1205. Errors can be caused, for example, by intersections of wires inserted into the circuit schematic, or by an accidental removal of a wire providing an electrical connection in the cleanup of the circuit schematic 300. If an error is present, a manual editing of the circuit schematic 300 can be performed to correct the error. Additionally and/or alternatively, the original circuit schematic 300 including the instances 100a, 100b of the first transistor symbol 100, being an illustrative example of a first circuit symbol from a first process design kit, can be modified by means of an electronic design automation tool for providing a greater distance between the instances 100a, 100b. In doing so, the electronic design automation tool can automatically move the wires connected to the instances 100a, 100b using conventional methods, so that the connectivity of the circuit is maintained. Then, the acts performed at 1304 to 1309 can be performed again on the basis of the modified circuit schematic. Providing a greater distance between the instances 100a, 100b can help to reduce a risk of errors relating to intersections of wires causing electric shorts occurring.

In the following, further examples of circuit symbols and circuit schematics wherein a replacement of instances of circuit symbols can be performed in accordance with methods according to embodiments will be described with reference to FIGS. 7-11. For processing the circuit symbols and circuit schematics, systems and methods as described above with reference to FIGS. 1-6, 12 and 13 can be used. For convenience, in FIGS. 1-6, on the one hand, and in FIGS. 7-11, on the other hand, like reference numerals have sometimes been used to denote like components and a detailed description thereof will sometimes be omitted.

Figure 7:
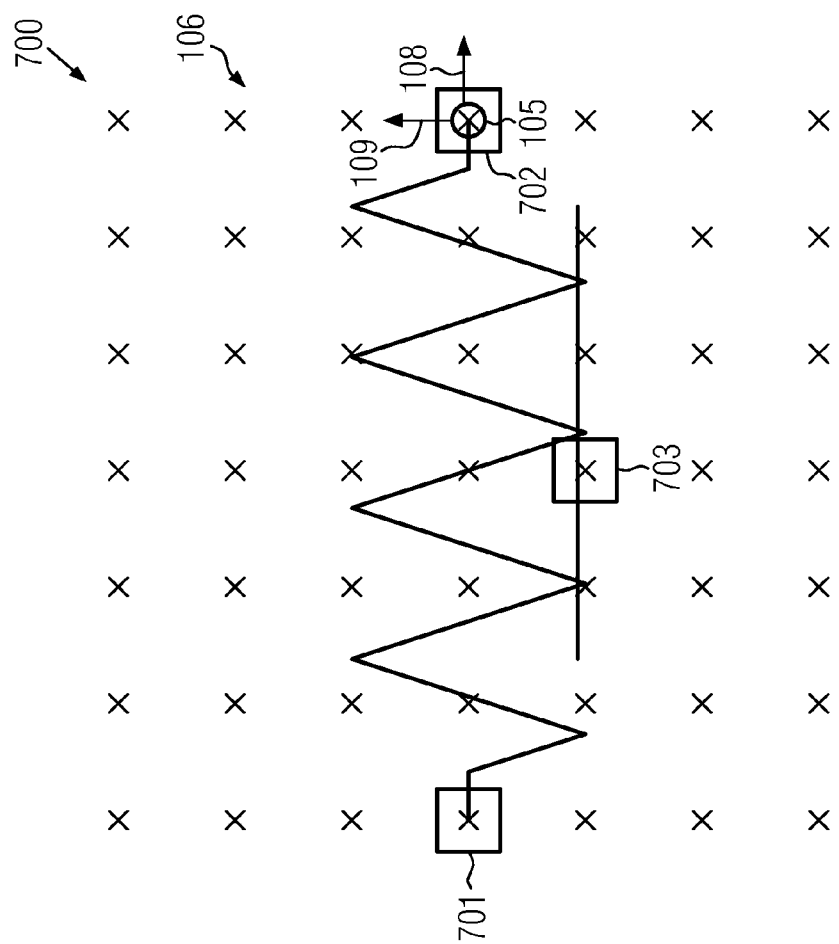
FIGS. 7 and 8 schematically illustrate resistor symbols.

FIG. 7 schematically illustrates one illustrative embodiment of a resistor symbol 700. The transistor symbol 700 includes an artwork and pins 701, 702, 703. For each of the pins 701, 702, 703, a position vector can be provided that defines a position of a center point of a respective pin relative to a circuit symbol master coordinate system having an origin 105, an x-axis 108 and a y-axis 109. The positions of the center points of the pins 701, 702, 703 and, optionally, other elements of the first resistor symbol 700 can be defined on grid points of a snap grid 106. The first resistor symbol 700 can be provided by a first process design kit.

Figure 8:
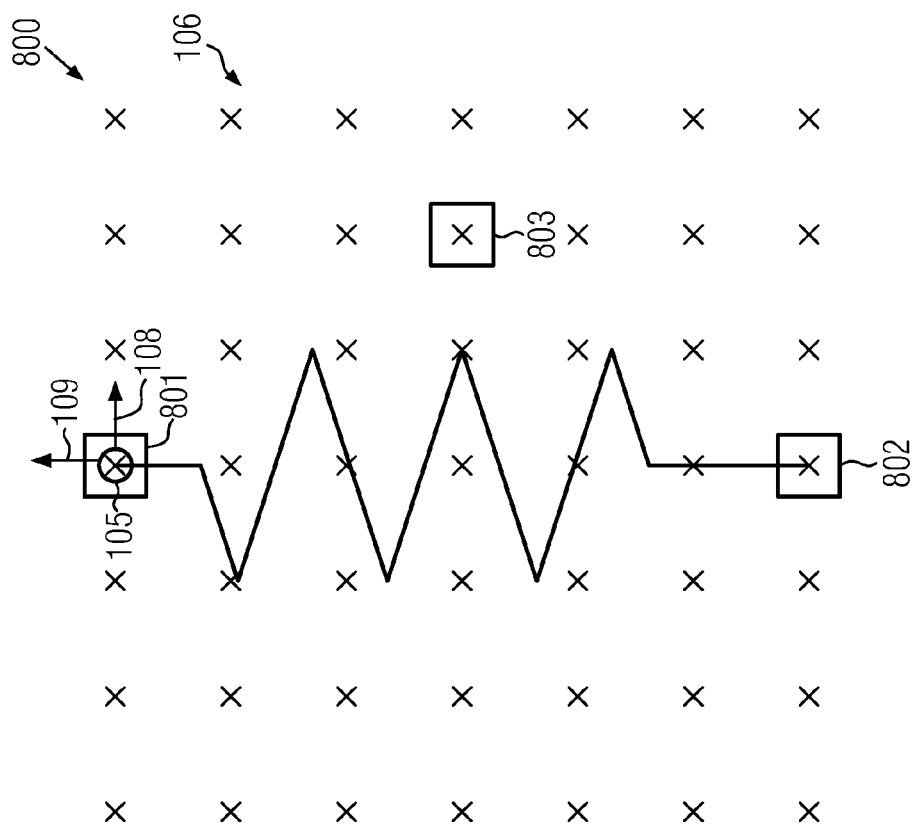

FIG. 8 shows a schematic view of one illustrative embodiment of a second resistor symbol 800. The second resistor symbol 800, which can be provided by a second process design kit, can include an artwork and pins 801, 802, 803. Each of the pins 801, 802, 803 can have a center point that is located on a grid point of a snap grid 106. The second resistor symbol 800 can represent a resistor of the same type as the first resistor symbol 700. The pin 801 can correspond to the pin 701, the pin 802 can correspond to the pin 702 and the pin 803 can correspond to the pin 703. Each of the pins 801, 802, 803 can have a position vector associated therewith that defines a position of the center point of the respective pin relative to a circuit symbol master coordinate system having origin 105, x-axis 108 and y-axis 109.

Figure 9:
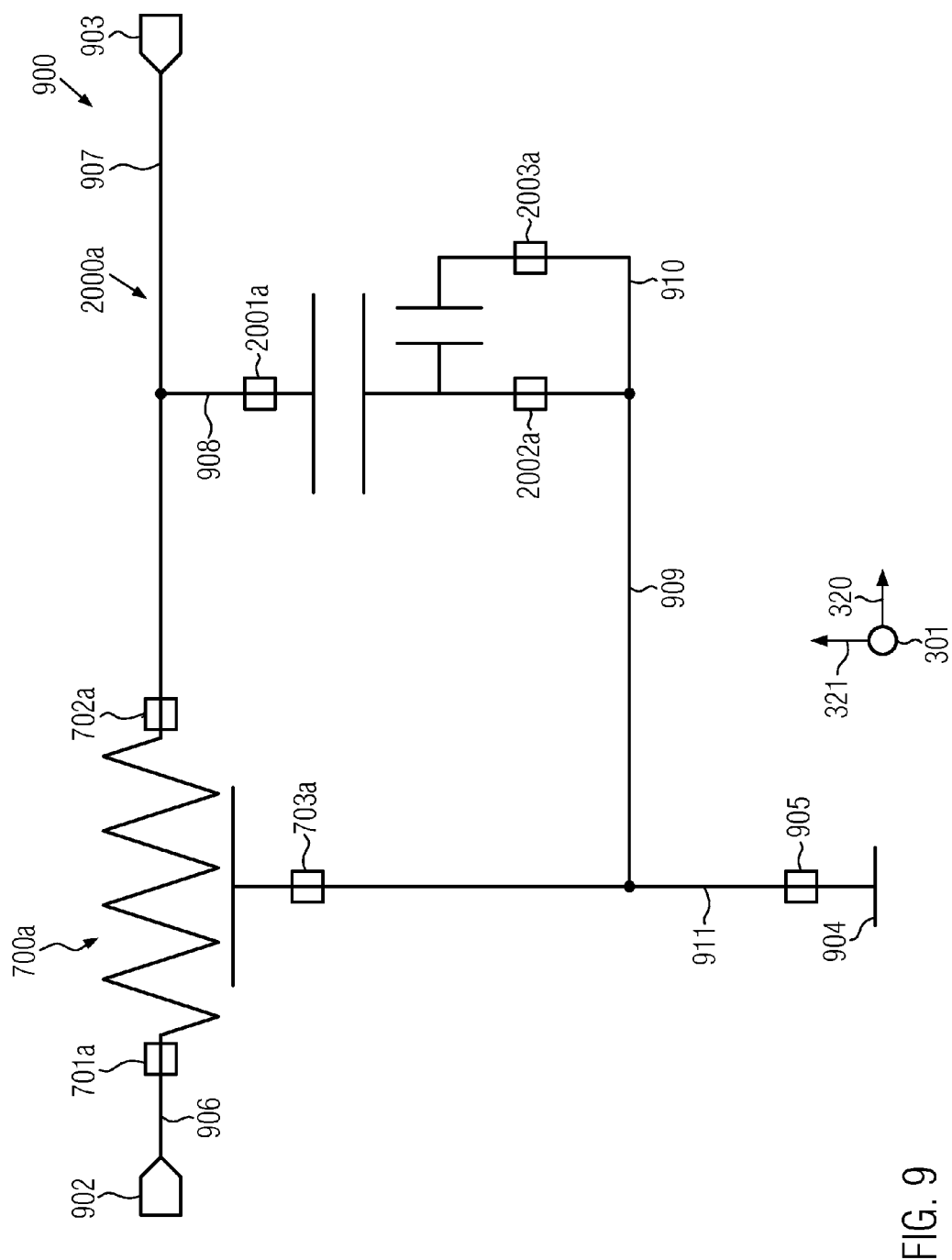
FIG. 9 schematically illustrates a circuit schematic.

FIG. 9 schematically illustrates one illustrative embodiment of a circuit schematic 900 of a low pass filter. The circuit schematic 900 can include an instance 700a of the first resistor symbol 700, wherein the first resistor symbol 700 provides an instance master symbol for the instance 700a. The instance 700a can have an instance transformation associated therewith, which maps position vectors in the circuit symbol master coordinate system to position vectors in a schematic coordinate system having origin 301, x-axis 320 and y-axis 321. In the example illustrated in FIGS. 7 and 9, the instance transformation associated with the instance 700a can include a translation into both a direction of the x-axis 320 and a direction of the y-axis 321, which can be represented by an instance translation vector having a non-zero x-component and a non-zero y-component. Additionally, the instance transformation can include an instance orientation matrix. In the example illustrated in FIGS. 7 and 9, the instance orientation matrix can be a two-dimensional unit matrix so that the relative orientation of the pins 701a, 702a, 703a is substantially identical to the relative orientation of the pins 701, 702, 703 of the first resistor symbol 700.

The circuit schematic 900 can further include an instance 2000a of a capacitor symbol (not shown) having pins 2001a, 2002a and 2003a. Similar to the instance 700a of the resistor symbol 700, the instance 2000a of the capacitor symbol can have an instance transformation associated therewith.

Additionally, the circuit schematic 900 can include wires 906, 907, 908, 909, 910, 911, an input 902, an output 903 and a source potential connection 904 having a pin 905.

In some embodiments, a first and a second process design kit can be provided. The first process design kit can include the first resistor symbol 700 and other instance master symbols, for example, the instance master symbol for the instance 2000a of the capacitor. In one illustrative embodiment, the second process design kit can include the second resistor symbol 800 and other instance master symbols, for example an instance master symbol for a capacitor of the same type as the capacitor represented by the instance 2000a of the capacitor symbol. This can be done in accordance with the acts performed at 1301 in the method described above with reference to the flow diagram 1300 of FIG. 13.

Thereafter, in one illustrative embodiment, an adjustment transformation can be calculated for each pair of circuit symbols including an instance master symbol for a circuit element from the first process design kit and a corresponding instance master symbol for the circuit element from the second process design kit. In particular, an adjustment transformation can be calculated for the resistor symbols 700, 800 and/or for the instance master symbols for the capacitor from the first and the second process design kit. This can be done in accordance with the acts performed in the method illustrated by the flow diagram 1300 of FIG. 13 at 1302. Additionally, for each pair of circuit symbols, data representing wire segments can be formed on the basis of an error of the adjustment transformation, in accordance with the acts performed at 1303 in the method illustrated by the flow diagram 1300.

Figure 10:
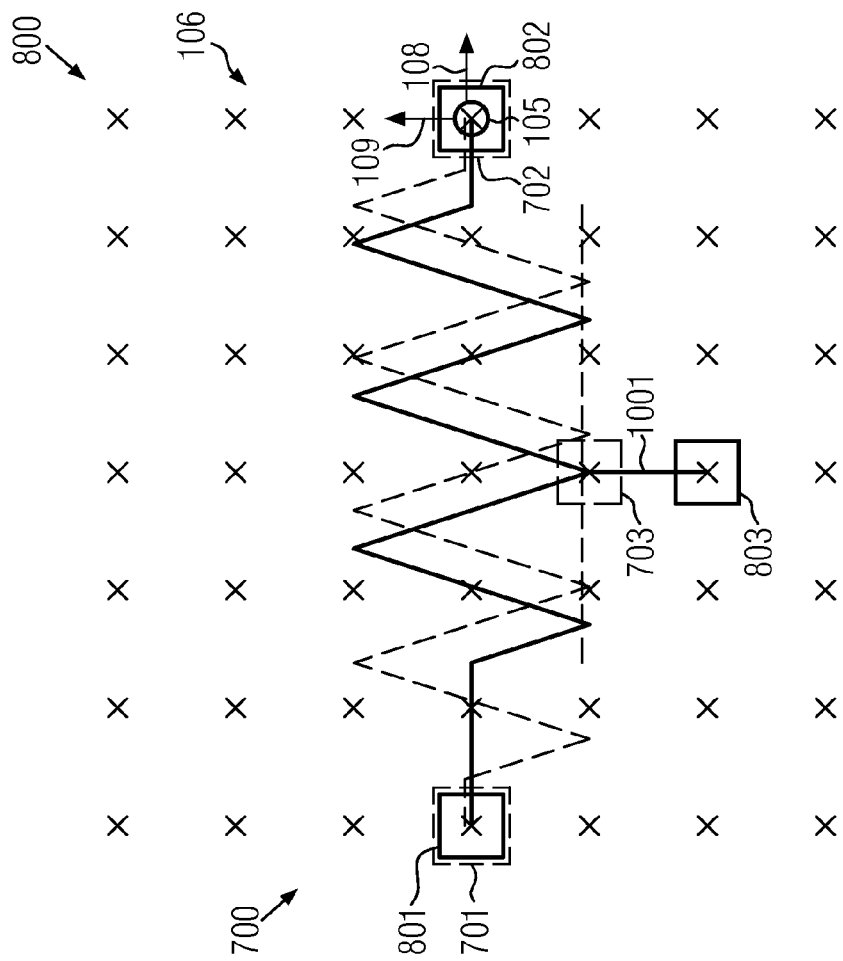
FIG. 10 shows the resistor symbols of FIGS. 7 and 8 after applying an adjustment transformation to one of the resistor symbols.

FIG. 10 illustrates the resistor symbols 700, 800 wherein positions of elements of the second resistor symbol 800 have been transformed by means of the adjustment transformation that was determined for the resistor symbols 700, 800. For more clearly distinguishing the resistor symbols 700, 800, the first resistor symbol 700 is shown by means of dashed lines.

In the illustrated example, the adjustment transformation can include a rotation by an angle of 270 degrees and a translation so that the pin 802 of the second resistor symbol 800 is moved to the origin 105 whereas, in the original second resistor symbol 800, the pin 801 is at the origin 105, as illustrated in FIG. 8. After applying the adjustment transformation, the pins 801 and 701 are at substantially the same position. Similarly, the pins 702, 802 can be at substantially the same position. The pins 703, 803 can be at different positions, due to the different relative arrangement of the pin 703 relative to the pins 701, 702 of the first resistor symbol 700, on the one hand, and the pin 803 relative to the pins 801, 802 of the second resistor symbol 800, on the other hand. Accordingly, a wire 1001 connecting positions of the center points of the pins 703, 803 can be provided, in accordance with the acts performed at 1303 in the method illustrated by the flow diagram 1300 of FIG. 13.

Then, at 1304, the circuit schematic 900 can be received and, optionally, a first netlist of the circuit schematic 900 can be extracted at 1305.

Figure 11:
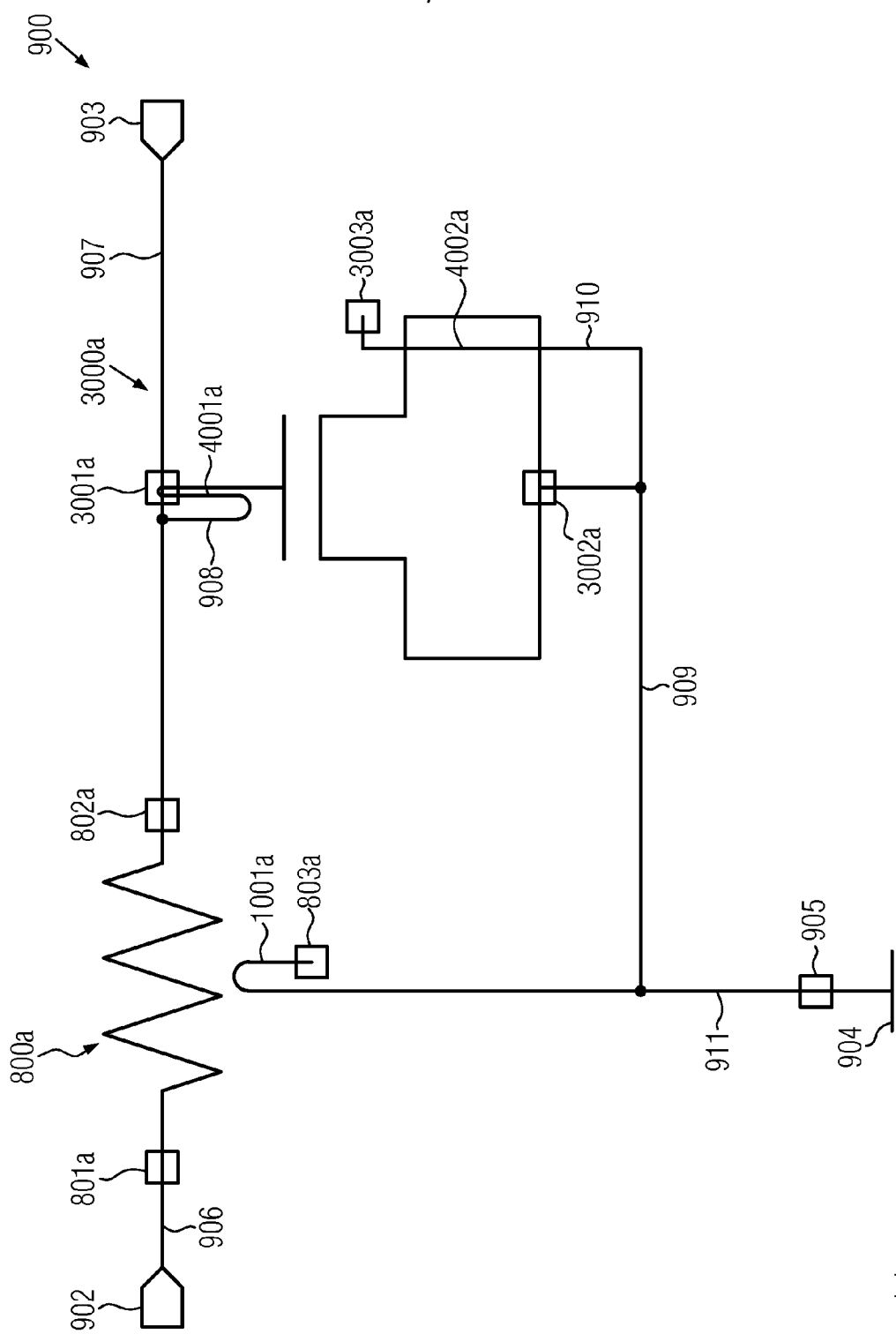
FIG. 11 shows the circuit schematic of FIG. 9 after a replacement of circuit symbols.

Then, as shown in FIG. 11, the instance 700a of the first resistor symbol 700 can be replaced with an instance 800a of the second transistor symbol 800, and an instance 1001a of the wire 1001 can be included into the circuit schematic 900. An instance transformation for the instance 800a of the second resistor symbol 800 can be obtained by concatenating the adjustment transformation and the instance transformation for the instance 700a of the first resistor symbol 700 as described above. Similarly, the instance 2000a of the first capacitor symbol can be replaced with an instance 3000a of a second capacitor symbol from the second process design kit having pins 3001a, 3002a, 3003a, and instances of wires 4001a, 4002a can be included into the circuit schematic 900.

Thereafter, optionally, the circuit schematic can be cleaned up at 1307, a second netlist can be extracted at 1308, and the netlists can be compared at 1309.

The present disclosure is not limited to embodiments wherein the adjustment transformation and masters of the wires to be included into the circuit schematic are determined once for each pair of symbols including a symbol for a circuit element from the first process design kit and a symbol for the circuit element from the second process design kit in symbol master coordinates, as described above. In other embodiments, for each instance of a first circuit symbol from the first process design kit, position vectors for each of the pins of the instance can be provided by applying the instance transformation associated with the instance of the first circuit symbol to a position vector in the circuit master coordinate system that defines a position of the pin in the circuit symbol master coordinate system.

Thereafter, the instance transformation for the instance of the second circuit symbol that is to be used instead of the instance of the first circuit symbol can be calculated using techniques corresponding to those described above for the calculation of the adjustment transformation, wherein the position vectors representing positions of the pins of the instance of the first circuit symbol are used instead of position vectors defining positions of the pins of the first circuit symbol in the circuit symbol master coordinate system.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A method, comprising:
    obtaining first data representing a first circuit symbol in a computer system, said first circuit symbol having a plurality of first pins, each first pin having a first position vector associated therewith;
    obtaining second data representing a second circuit symbol in the computer system, said second circuit symbol having a plurality of second pins, each second pin having a second position vector associated therewith, each of said plurality of second pins corresponding to a respective one of said plurality of first pins; and
    determining an adjustment transformation in the computer system, the adjustment transformation mapping position vectors to transformed position vectors, wherein said adjustment transformation minimizes an error measure that is based on one or more deviations, each deviation being a deviation between a transformed position vector and said first position vector associated with one of said first pins, said transformed position vector being obtainable by applying said adjustment transformation to said second position vector associated with said second pin corresponding to said first pin.

2. The method of claim 1, wherein said error measure comprises a sum over said plurality of first pins of said deviation between said transformed position vector that is obtained by applying said adjustment transformation to said second position vector associated with said second pin corresponding to said first pin and said first position vector associated with said first pin; and
wherein said deviation between said transformed position vector and said first position vector associated with said first pin comprises a vector norm of a difference between said transformed position vector and said first position vector associated with said first pin.

3. The method of claim 2, wherein said determining of said adjustment transformation comprises calculating an adjustment orientation matrix on the basis of a first pin position matrix and a second pin position matrix, each of said first pin position matrix and said second pin position matrix having a number of rows being equal to a number of said first pins and a number of said second pins, each of said rows of said first pin position matrix comprising components of a vector that is obtained by subtracting a mean of said plurality of first position vectors from a respective one of said plurality of first position vectors, each of said rows of said second pin position matrix comprising components of a vector that is obtained by subtracting a mean of said plurality of second position vectors from a respective one of said plurality of second position vectors.

4. The method of claim 3, wherein said adjustment orientation matrix defines at least one of a rotation and a reflection.

5. The method of claim 4, wherein said calculating of said adjustment orientation matrix comprises calculating a singular value decomposition of one of said first pin position matrix and said second pin position matrix.

6. The method of claim 5, wherein said determining of said adjustment transformation further comprises determining an adjustment translation vector on the basis of said adjustment orientation matrix, said mean of said plurality of first position vectors and said mean of said plurality of second position vectors.

7. The method of claim 6, wherein said determining of said adjustment transformation further comprises:
rounding said adjustment orientation matrix to one of a plurality of predetermined constrained orientation changes; and
rounding said adjustment translation vector to a predetermined snap grid.

8. The method of claim 7, further comprising:
for each of said plurality of second pins:
calculating a transformed position vector by applying said determined adjustment transformation to said position vector associated with said second pin; and
if said calculated transformed position vector is different from said first position vector associated with said first pin corresponding to said second pin, forming third data representing one or more wire segments connecting a position represented by said transformed position vector with a position represented by said first position vector associated with said first pin corresponding to said second pin.

9. The method of claim 8, further comprising:
providing fourth data representing a circuit schematic, said circuit schematic comprising one or more instances of said first circuit symbol, each instance of said first circuit symbol having a first instance transformation associated therewith, said first instance transformation mapping position vectors in a circuit symbol master coordinate system to position vectors in a schematic coordinate system; and
replacing each instance of said first circuit symbol with a respective instance of said second circuit symbol, each instance of said second circuit symbol having a second instance transformation associated therewith, said second instance transformation mapping position vectors in said circuit symbol master coordinate system to position vectors in said schematic coordinate system;
wherein the replacement of each instance of said first circuit symbol with the respective instance of said second circuit symbol comprises, for each instance of said first circuit symbol, determining said second instance transformation associated with said respective instance of said second circuit symbol.

10. The method of claim 9, wherein each of said first position vectors is a position vector in said circuit symbol master coordinate system that defines a position of said first pin associated with said first position vector in said circuit symbol master coordinate system, and
wherein each of said second position vectors is a position vector in said circuit symbol master coordinate system that defines a position of said second pin associated with said second position vector in said circuit symbol master coordinate system.

11. The method of claim 10, wherein said determining of said second instance transformation comprises concatenating said adjustment transformation and said first instance transformation, so that said second instance transformation corresponds to a combination of said adjustment transformation and said first instance transformation wherein said adjustment transformation is performed before said first instance transformation.

12. The method of claim 11, further comprising:
for each instance of said first circuit symbol, applying said first instance transformation associated with said instance of said first circuit symbol to each of said third data representing one or more wire segments to obtain one or more wire segments adjacent said respective instance of said second circuit symbol, and including said one or more wire segments into said circuit schematic represented by said fourth data.

13. The method of claim 12, further comprising:
before the replacement of each of said instances of said first circuit symbol with a respective instance of said second circuit symbol, extracting a first netlist from said circuit schematic;
after the replacement of each of said instances of said first circuit symbol with a respective instance of said second circuit symbol, extracting a second netlist from said circuit schematic; and
comparing said first netlist and said second netlist to determine if a connectivity of an electric circuit represented by said circuit schematic has been affected by the replacement of each of said instances of said first circuit symbol with a respective instance of said second circuit symbol.

14. The method of claim 13, wherein said first circuit symbol comprises an instance master symbol for a circuit element of a first process design kit, and said second circuit symbol comprises an instance master symbol for a circuit element of a second process design kit.

15. The method of claim 9, wherein said obtaining of said first and second data, and said determination of said adjustment transformation are performed for each instance of said first circuit symbol;
- wherein each of said first position vectors is a position vector in said schematic coordinate system obtained by applying said instance transformation associated with said instance of said first circuit symbol to a position vector in said circuit master coordinate system that defines a position of said first pin in said circuit symbol master coordinate system;
- wherein each of said second position vectors is a position vector in said circuit symbol master coordinate system that defines a position of said second pin associated with said second position vector in a circuit symbol master coordinate system; and
- wherein said determining of said second instance transformation comprises providing said adjustment transformation as said second instance transformation.

16. A method, comprising:
- obtaining first data representing a first circuit symbol in a computer system, said first circuit symbol having a plurality of first pins, each first pin having a first position vector associated therewith;
- obtaining second data representing a second circuit symbol in the computer system, said second circuit symbol having a plurality of second pins, each second pin having a second position vector associated therewith, each of said plurality of second pins corresponding to a respective one of said plurality of first pins;
- determining an adjustment transformation in the computer system, the adjustment transformation mapping position vectors to transformed position vectors, wherein said determining of said adjustment transformation comprises calculating an adjustment orientation matrix, said calculating of said adjustment orientation matrix comprising:
  - forming a first pin position matrix and a second pin position matrix, each of said first pin position matrix and said second pin position matrix having a number of rows that is one of equal to and greater than a number of said plurality of first pins and a number of said plurality of second pins, each of said rows of said first pin position matrix comprising components of a respective vector that is obtained by subtracting a mean of a first set of position vectors that includes said plurality of first position vectors and, if the number of rows of said first pin position matrix and said second pin position matrix is greater than the number of said plurality of first pins and the number of said plurality of second pins, at least one duplicate of at least one of said plurality of first position vectors from a respective member of the first set of position vectors, each of said rows of said second pin position matrix comprising components of a respective vector that is obtained by subtracting a mean of a second set of position vectors that includes said plurality of second position vectors and, if the number of rows of said first pin position matrix and said second pin position matrix is greater than the number of said plurality of first pins and the number of said plurality of second pins, at least one duplicate of at least one of said second position vectors, from a respective member of said second set of position vectors;
  - calculating a pseudoinverse of one of said first pin position matrix and said second pin position matrix; and
  - multiplying said pseudoinverse of one of said first pin position matrix and said second pin position matrix with the other of said first pin position matrix and said second pin position matrix.

17. The method of claim 16, wherein calculating said pseudoinverse of said one of said first pin position matrix and said second pin position matrix comprises calculating a singular value decomposition of said one of said first pin position matrix and said second pin position matrix.

18. The method of claim 17, wherein said determining of said adjustment transformation further comprises calculating an adjustment translation vector by subtracting a product of said adjustment orientation matrix and said mean of said plurality of second position vectors from said mean of said plurality of first position vectors.

19. A system, comprising:
- a memory, said memory comprising first data representing a first circuit symbol, said first circuit symbol having a plurality of first pins, each of said plurality of first pins having a first position vector associated therewith, and second data representing a second circuit symbol, said second circuit symbol having a plurality of second pins, each of said plurality of second pins having a second position vector associated therewith, each of said plurality of second pins corresponding to a respective one of said plurality of first pins; and
- an adjustment transformation calculator determining an adjustment transformation mapping position vectors to transformed position vectors, wherein said adjustment transformation minimizes an error measure that is based on one or more deviations, each deviation being a deviation between a transformed position vector and said first position vector associated with one of said first pins, said transformed position vector being obtainable by applying said adjustment transformation to said second position vector associated with said second pin corresponding to said first pin.

20. A system, comprising:
- means for obtaining first data representing a first circuit symbol, said first circuit symbol having a plurality of first pins, each of said plurality of first pins having a first position vector associated therewith;
- means for obtaining second data representing a second circuit symbol, said second circuit symbol having a plurality of second pins, each of said plurality of second pins having a second position vector associated therewith, each of said plurality of second pins corresponding to a respective one of said plurality of first pins; and
- means for determining an adjustment transformation mapping position vectors to transformed position vectors, wherein said adjustment transformation minimizes an error measure that is based on one or more deviations, each deviation being a deviation between a transformed position vector and said first position vector associated with one of said first pins, said transformed position vector being obtainable by applying said adjustment transformation to said second position vector associated with said second pin corresponding to said first pin.

* * * * *